(12) United States Patent
Iwashita et al.

(10) Patent No.: US 9,683,170 B2
(45) Date of Patent: *Jun. 20, 2017

(54) LIQUID CRYSTAL COMPOSITION AND LIQUID CRYSTAL DISPLAY DEVICE USING THE SAME

(71) Applicant: DIC Corporation, Tokyo (JP)

(72) Inventors: Yoshinori Iwashita, Kita-adachi-gun (JP); Makoto Negishi, Kita-adachi-gun (JP)

(73) Assignee: DIC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/353,445

(22) PCT Filed: Mar. 26, 2013

(86) PCT No.: PCT/JP2013/058811
§ 371 (c)(1),
(2) Date: Apr. 22, 2014

(87) PCT Pub. No.: WO2014/155532
PCT Pub. Date: Oct. 2, 2014

(65) Prior Publication Data
US 2016/0060521 A1    Mar. 3, 2016

(51) Int. Cl.
*C09K 19/36* (2006.01)
*C09K 19/30* (2006.01)
(Continued)

(52) U.S. Cl.
CPC .......... *C09K 19/3003* (2013.01); *C09K 19/44* (2013.01); *C09K 2019/0448* (2013.01);
(Continued)

(58) Field of Classification Search
CPC ..................................... C09K 19/36
See application file for complete search history.

(56) References Cited

U.S. PATENT DOCUMENTS

2008/0011984 A1    1/2008  Fujita et al.
2008/0193681 A1    8/2008  Klasen-Memmer et al.
(Continued)

FOREIGN PATENT DOCUMENTS

CN    101519594 A  *  9/2009
JP    6-235925 A     8/1994
(Continued)

OTHER PUBLICATIONS

Extended European Search Report (ESSR) dated Oct. 30, 2015 issued in counterpart European patent application No. 13869858.4. (4 pages).

(Continued)

*Primary Examiner* — Chanceity Robinson
(74) *Attorney, Agent, or Firm* — Westerman, Hattori, Daniels & Adrian, LLP

(57) ABSTRACT

There is provided a liquid crystal composition which is suitably used in a liquid crystal display device without impairment of properties inherent in liquid crystal display devices. There is provided a liquid crystal display device in which such a liquid crystal composition is used. There is provided a liquid crystal composition having a negative dielectric anisotropy and containing a compound represented by Formula (I-1) and at least one compound represented by General Formula (II) and also provided a liquid crystal display device in which such a liquid crystal composition is used.

11 Claims, 2 Drawing Sheets

(51) Int. Cl.
*C09K 19/44* (2006.01)
*C09K 19/04* (2006.01)
*C09K 19/12* (2006.01)

(52) U.S. Cl.
CPC .. *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01)

(56) References Cited

U.S. PATENT DOCUMENTS

| | | | |
|---|---|---|---|
| 2008/0308768 A1* | 12/2008 | Klasen-Memmer | ... C09K 19/02 252/299.61 |
| 2009/0103011 A1 | 4/2009 | Bernatz et al. | |
| 2010/0181532 A1* | 7/2010 | Hattori | ............... C09K 19/3402 252/299.61 |
| 2011/0089373 A1 | 4/2011 | Yanai et al. | |
| 2011/0096285 A1 | 4/2011 | Saito | |
| 2011/0278501 A1* | 11/2011 | Hattori | ............... C09K 19/3001 252/299.61 |
| 2012/0161072 A1 | 6/2012 | Saito et al. | |
| 2012/0268706 A1 | 10/2012 | Goebel et al. | |
| 2013/0001469 A1 | 1/2013 | Hattori et al. | |
| 2013/0062559 A1 | 3/2013 | Hattori et al. | |
| 2013/0062560 A1* | 3/2013 | Hattori | ............... C09K 19/3402 252/299.61 |
| 2013/0135575 A1* | 5/2013 | Gotoh | .................... C09K 19/14 349/183 |
| 2013/0183460 A1 | 7/2013 | Klasen-Memmer et al. | |
| 2013/0248763 A1* | 9/2013 | Goebel | ............. C09K 19/3003 252/299.61 |
| 2013/0258268 A1 | 10/2013 | Goebel et al. | |
| 2013/0335693 A1 | 12/2013 | Klassen-Memmer et al. | |
| 2014/0097383 A1 | 4/2014 | Furusato et al. | |
| 2014/0110630 A1 | 4/2014 | Goebel et al. | |
| 2014/0138581 A1 | 5/2014 | Archetti et al. | |
| 2014/0139786 A1 | 5/2014 | Engel et al. | |
| 2014/0339472 A1 | 11/2014 | Saigusa et al. | |
| 2015/0146155 A1 | 5/2015 | Engel et al. | |

FOREIGN PATENT DOCUMENTS

| | | |
|---|---|---|
| JP | 2002-357830 A | 12/2002 |
| JP | 2006-58755 A | 3/2006 |
| JP | 2008-031432 A | 2/2008 |
| JP | 2008-505235 A | 2/2008 |
| JP | 2010-163559 A | 7/2010 |
| JP | 2011-089013 A | 5/2011 |
| JP | 2012-136623 A | 7/2012 |
| WO | 2005/123896 A2 | 12/2005 |
| WO | 2010/084810 A1 | 7/2010 |
| WO | 2011/132451 A1 | 10/2011 |
| WO | 2011/152494 A1 | 12/2011 |

OTHER PUBLICATIONS

Non-Final Office Action dated Nov. 4, 2016, issued in U.S. Appl. No. 14/772,564 (31 pages).
Non-Final Office Action dated Mar. 24, 2016, issued in U.S. Appl. No. 14/772,564 (25 pages).
International Search Report dated Jun. 18, 2013, issued in counterpart Application No. PCT/JP2013/058814 (2 pages).
International Search Report dated Jul. 2, 2013, issued in counterpart Patent Application No. PCT/JP2013/058812 (2 pages).
English Translation of Notification of Reason for Refusal for JP2013-537993, mailing dated of Oct. 22, 2013 (4 pages).
Non-Final Office Action dated Jan. 22, 2016, issued in U.S. Appl. No. 14/353,184 (15 pages).
Non-Final Office Action dated Aug. 4, 2016, issued in U.S. Appl. No. 14/353,184 (13 pages).

* cited by examiner

LIQUID CRYSTAL COMPOSITION AND LIQUID CRYSTAL DISPLAY DEVICE USING THE SAME

TECHNICAL FIELD

The present invention relates to a liquid crystal composition and liquid crystal display device which are useful for producing a liquid crystal display apparatus or another apparatus.

BACKGROUND ART

Liquid crystal display devices have been applied to, for example, watches, calculators, a variety of measuring equipment, panels used in automobiles, word processors, electronic notebooks, printers, computers, television sets, clocks, and advertising boards. Representative examples of types of liquid crystal display devices include a TN (twisted nematic) type, an STN (super twisted nematic) type, and a VA (vertical alignment) type and IPS (in-plane switching) type in which a TFT (thin film transistor) is used. Liquid crystal compositions used for such liquid crystal display devices need to satisfy the following requirements: being stable to external elements such as moisture, air, heat, and light; having a liquid crystal phase in a wide temperature range mainly including room temperature as much as possible; having a low viscosity; and enabling a low driving voltage. In addition, liquid crystal compositions are composed of several to tens of compounds to adjust, for example, dielectric anisotropy ($\Delta\epsilon$) and/or refractive index anisotropy ($\Delta n$) to be optimum to individual display devices.

A liquid crystal composition having a negative $\Delta\epsilon$ is used in vertical-alignment-type displays and widely used in, for instance, liquid crystal TV sets. Meanwhile, in all types of driving, there have been demands for low driving voltage, quick response, and a broad range of operation temperature. In other words, a liquid crystal composition having a positive $\Delta\epsilon$ with a large absolute value, a low viscosity ($\eta$), and a high nematic phase-isotropic liquid phase transition temperature ($T_{ni}$) has been demanded. In order to determine $\Delta n \times d$ that is the product of $\Delta n$ and a cell gap (d), the $\Delta n$ of a liquid crystal composition needs to be adjusted to be in a range suitable for the cell gap. In addition, in the case where liquid crystal display devices are applied to television sets or other apparatuses, the liquid crystal display devices need to quickly respond, which generates a demand for a liquid crystal composition having a small $\gamma_1$.

In traditional preparation of a liquid crystal composition having a small $\gamma_1$, a compound having a dialkyl bicyclohexane skeleton is generally used (see Patent Literature 1). Bicyclohexane compounds, however, generally exhibit high vapor pressure, while they are highly effective for a reduction in $\gamma_1$; in particular, such a tendency is especially remarkable in a compound having a short alkyl chain. In addition, such a compound also tends to have a low $T_{ni}$; hence, an alkyl bicyclohexane compound having side chains with seven or more carbon atoms in total is employed in many cases in terms of the length of the side chain. A compound having a short side chain has not been sufficiently studied.

As liquid crystal display devices have come to be used in a broad range of applications, usage and manufacturing thereof have been greatly changed. In order to adapt to such changes, properties other than known basic physical properties need to be optimum. In particular, a VA (vertical alignment) type and an IPS (in-plane switching) type have become popular as liquid crystal display devices in which liquid crystal compositions are used, and display devices having a very large size (e.g., 50 inches or lager) have been practically used. An increase in the size of substrates has changed a technique for putting a liquid crystal composition between substrates, and a one drop fill (ODF) technique has become mainstream in place of a typically employed vacuum injection technique (see Patent Literature 2); however, dropping a liquid crystal composition onto a substrate generates droplet stains with the result that display quality is degraded, which has become problematic. Furthermore, in order to define the pretilt angle of molecules of a liquid crystal material in a liquid crystal display device and enable quick response, PS (polymer stabilized) liquid crystal display devices and PSA (polymer sustained alignment) liquid crystal display devices have been developed (see Patent Literature 3), and the above-mentioned disadvantage has become more problematic. In particular, such liquid crystal display devices are characterized in that a monomer is added to a liquid crystal composition and that the monomer in the composition is cured. Since liquid crystal compositions used for active-matrix devices need to constantly have a high voltage-holding ratio, limited compounds can be used for such compositions; thus, use of compounds having ester bonds is restricted. A monomer used in PSA liquid crystal display devices is mainly an acrylate-based monomer which generally has an ester bond; however, such a compound is not normally used as a liquid crystal compound for active-matrix devices (see Patent Literature 3). Such an unsuitable material causes droplet stains to be generated, and defective display leads to a reduction in a yield of a liquid crystal display device, which has been problematic. Moreover, addition of additives, such as an antioxidant and light absorber, to a liquid crystal composition also causes the problem of a reduction in a yield.

The term "droplet stain" is herein defined as a phenomenon in which a white stain of a droplet of a liquid crystal composition appears on a screen in a black-display mode.

A technique for reducing droplet stains is disclosed, in which a polymer layer is formed in a liquid crystal layer through polymerization of a polymerizable compound added to a liquid crystal composition to reduce droplet stains caused by an effect of an orientation control film (Patent Literature 4). In this technique, however, the polymerizable compound added to the liquid crystal composition causes a problem of screen burn-in, and an effect of a reduction in droplet stains is insufficient; hence, development of a liquid crystal display device which is less likely to suffer from screen burn-in and droplet stains while maintaining basic properties inherent in liquid crystal display devices has been demanded.

CITATION LIST

Patent Literature

PTL 1: Japanese Unexamined Patent Application Publication (translation of PCT application) No. 2008-505235

PTL 2: Japanese Unexamined Patent Application Publication No. 6-235925

PTL 3: Japanese Unexamined Patent Application Publication No. 2002-357830

PTL 4: Japanese Unexamined Patent Application Publication No. 2006-58755

SUMMARY OF INVENTION

Technical Problem

It is an object of the present invention to provide a liquid crystal composition which is suitably used in a liquid crystal display device without impairment of properties inherent in liquid crystal display devices, such as dielectric anisotropy, viscosity, upper limit of temperature of a nematic phase, stability of a nematic phase at low temperature, and $\gamma_1$, and generation of screen burn-in in the display device, the liquid crystal composition being less likely to cause droplet stains in manufacturing of the liquid crystal display device and enabling ejection of a liquid crystal material in a stable amount in an ODF process; it is another object of the present invention to provide a liquid crystal display device in which such a liquid crystal composition is used.

Solution to Problem

In order to achieve the above-mentioned objects, the inventors have studied the constitutions of various liquid crystal compositions which are optimum for manufacturing of a liquid crystal display device by a dropping technique and have found that use of specific liquid crystal compounds at a predetermined mixing ratio enables a reduction in generation of droplet stains in a liquid crystal display device, thereby accomplishing the present invention.

Some aspects of the present invention provide a liquid crystal composition having a negative dielectric anisotropy and a liquid crystal display device including such a liquid crystal composition, the liquid crystal composition containing a compound represented by Formula (I-1) and at least one compound represented by General Formula (II):

[Chem. 1]

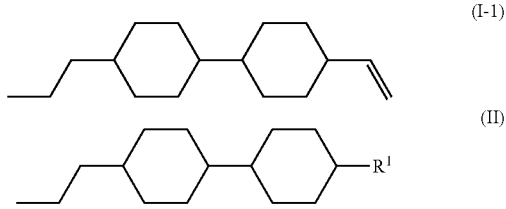

(where $R^1$ represents an alkyl group having 2 to 5 carbon atoms or an alkoxy group having 1 to 4 carbon atoms).

Advantageous Effects of Invention

The liquid crystal display device according to an aspect of the present invention very quickly responds and is less likely to suffer from screen burn-in and droplet stains due to a manufacturing process thereof; hence, such a liquid crystal display device is practically used in display apparatuses such as liquid crystal TV sets and monitors.

DESCRIPTION OF EMBODIMENTS

Figure 1:
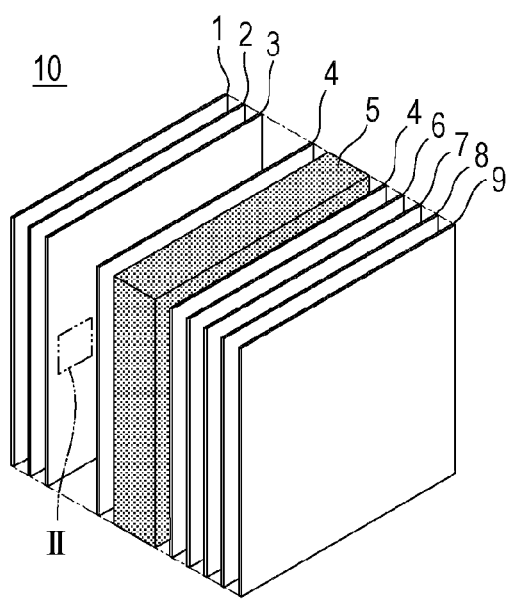
FIG. 1 schematically illustrates the structure of a liquid crystal display device.

A process of generating droplet stains have still been studied as described above; however, there has been high possibility in which an interaction of impurities in a liquid crystal compound with an alignment film and a chromatographic phenomenon have effects on such a process. Impurities in a liquid crystal compound are greatly influenced by a process for producing the compound; even compounds having a difference only in the number of carbon atoms in the side chains thereof may be produced by different methods in some cases. In particular, liquid crystal compounds are produced through a precise production process, and the production costs thereof are therefore high as compared with other chemical products; thus, an enhancement in the production efficiency has been highly demanded. Hence, in order to use an inexpensive material as much as possible, even when the number of carbon atoms in the side chain of a target compound is different from that in another target compound just by one, it is efficient to produce these compounds from totally different materials in some cases. Accordingly, individual substances that are to be contained in liquid crystal are produced through different processes in some cases; even in the case where the same process is employed, different materials are used in almost all the cases with the result that individual substances that are to be contained in liquid crystal contain different impurities in many cases. Droplet stains may be, however, caused by a very slight amount of impurity, and an attempt to reduce generation of droplet stains just by purification of substances that are to be contained in liquid crystal has limitation.

Meanwhile, once production processes are established, individual substances that are to be contained in liquid crystal are generally produced by constant methods. Even now that analytical techniques have been developed, it is uneasy to completely find out types of impurities contained in a substance; however it is necessary to design a composition on the basis of the assumption that individual substances that are to be contained in liquid crystal contain impurities specific thereto. The inventors have studied relationship between impurities contained in substances that are to be contained in liquid crystal and droplet stains and empirically found impurities that are contained in a composition but less likely to cause droplet stains and impurities that are likely to cause droplet stains. Hence, in order to reduce droplet stains, it is important to use specific compounds at a predetermined mixing ratio; in particular, a liquid crystal composition which is less likely to cause droplet stains is provided. Preferred embodiments which will now be described are on the basis of such a viewpoint.

In the liquid crystal composition of the present invention, the lower limit of the amount of a first component that is a compound represented by Formula (I-1) is preferably 3 mass %, more preferably 5 mass %, and further preferably 7 mass %; and the upper limit thereof is preferably 30 mass %, more preferably 25 mass %, and further preferably 23 mass %. In particular, in view of a response speed, the amount is preferably in the range of 15 to 30 mass %, and more preferably 20 to 30 mass %; in view of a driving voltage, the amount is preferably in the range of 3 to 20 mass %, and more preferably 5 to 15 mass %.

The amount of a compound represented by General Formula (II) is preferably in the range of 10 to 40 mass %, more preferably 15 to 35 mass %, and further preferably 10 to 23 mass %.

The compound represented by General Formula (II) is preferably at least one selected from the group consisting of compounds represented by Formulae (II-1) to (II-8).

[Chem. 2]

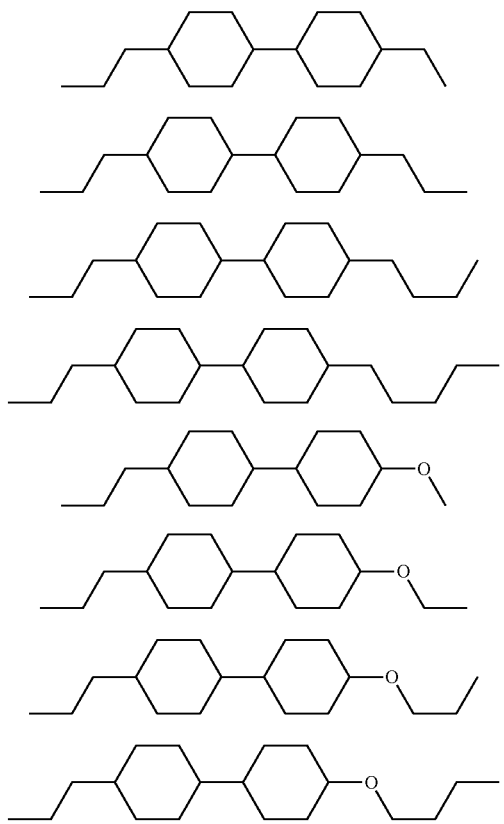

The compound represented by General Formula (II) is more preferably selected from the group consisting of compounds represented by Formulae (II-1) to (II-5) and (II-7), further preferably selected from the group consisting of compounds represented by Formulae (II-1) and (II-3) to (II-5), especially preferably selected from the group consisting of compounds represented by Formulae (II-1), (II-3), and (II-4), and most preferably a compound represented by Formula (II-1).

In the case where the liquid crystal composition of the present invention needs to have a high nematic-isotropic phase transition temperature ($T_{ni}$), at least one compound is preferably selected from the group consisting of compounds represented by Formulae (II-5) to (II-8), and more preferably selected from the group consisting of compounds represented by Formulae (II-5) and (II-7); and a compound represented by Formula (II-5) is further preferably employed.

In the case where a compound represented by Formula (II-1) is used in the liquid crystal composition of the present invention, the amount thereof is preferably in the range of 5 to 30 mass %, more preferably 7 to 28 mass %, further preferably 10 to 25 mass %, and especially preferably 10 to 23 mass %.

One or two compounds selected from the group consisting of compounds represented by Formulae (I-2) and (I-3)

[Chem. 3]

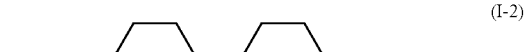

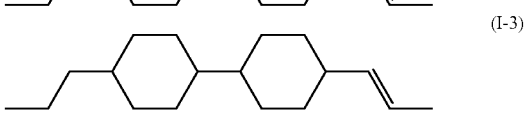

can be contained in the liquid crystal composition of the present invention.

In the case where compounds represented by Formulae (I-2) and (I-3) are selected, a compound represented by Formula (I-2) is preferably employed.

In the case where compounds represented by Formulae (I-2) and (I-3) are selected, the total amount thereof is preferably in the range of 3 to 20 mass %, more preferably 4 to 15 mass %, and further preferably 5 to 12 mass %.

The liquid crystal composition of the present invention can further contain a compound selected from the group consisting of compounds represented by General Formula (III):

[Chem. 4]

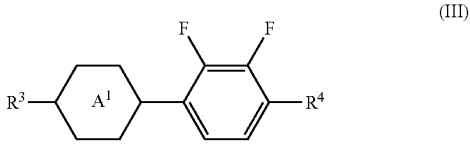

(where $R^3$ and $R^4$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; at least one hydrogen atom of the alkyl group, alkenyl group, alkoxy group, and/or alkenyloxy group is optionally substituted with a fluorine atom; the methylene group of the alkyl group, alkenyl group, alkoxy group, and/or alkenyloxy group is optionally substituted with an oxygen atom provided that the oxygen atom is not bonded to another oxygen atom in series or substituted with a carbonyl group provided that the carbonyl group is not bonded to another carbonyl group in series; $A^1$ represents a 1,4-cyclohexylene group, a 1,4-phenylene group, or a tetrahydropyran-2,5-diyl group; and in the case where $A^1$ represents a 1,4-phenylene group, at least one hydrogen atom of the 1,4-phenylene group is optionally substituted with a fluorine atom).

In the compound represented by General Formula (III), $R^3$ and $R^4$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^3$ is preferably an alkyl group having 1 to 8 carbon atoms or an alkenyl group having 2 to 8 carbon atoms, more preferably an alkyl group having 1 to 8 carbon atoms, and further preferably an alkyl group having 2 to 5 carbon atoms; $R^4$ is preferably an alkyl group having 1 to 8 carbon atoms or an alkoxy group having 1 to 8 carbon atoms, more preferably an alkoxy group having 1 to 8 carbon atoms, and further preferably an alkoxy group having 2 to 5 carbon atoms.

In the compound represented by General Formula (III), $A^1$ represents a 1,4-cyclohexylene group, a 1,4-phenylene group, or a tetrahydropyran-2,5-diyl group, and preferably a 1,4-cyclohexylene group or a 1,4-phenylene group. In the case where $A^1$ is a 1,4-phenylene group, at least one hydrogen atom of the 1,4-phenylene group is optionally substituted with a fluorine atom, at most three hydrogen atoms are preferably substituted with fluorine atoms, at most two hydrogen atoms are more preferably substituted with fluorine atoms, one hydrogen atom is further preferably substituted with a fluorine atom, and the 1,4-phenylene group is especially preferably unsubstituted.

In the case where $A^1$ in the compound represented by General Formula (III) is a 1,4-cyclohexylene group, such a compound can be represented by General Formula (IIIa):

[Chem. 5]

(IIIa)

(where $R^{3a}$ and $R^{4a}$ each represent the same group as specified for $R^3$ and $R^4$ in General Formula (III)); the compound represented by General Formula (IIIa) is preferably selected from the group consisting of compounds represented by Formulae (IIIa-1) to (IIIa-8),

[Chem. 6]

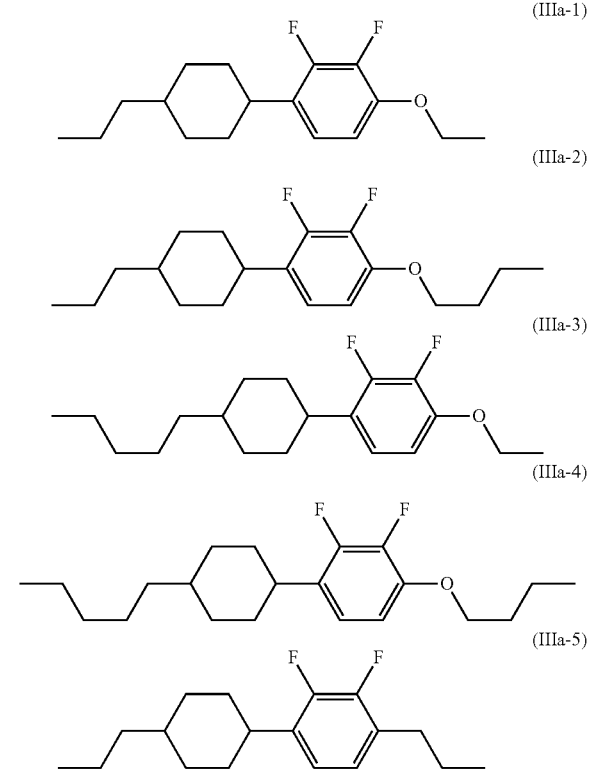

(IIIa-1)

(IIIa-2)

(IIIa-3)

(IIIa-4)

(IIIa-5)

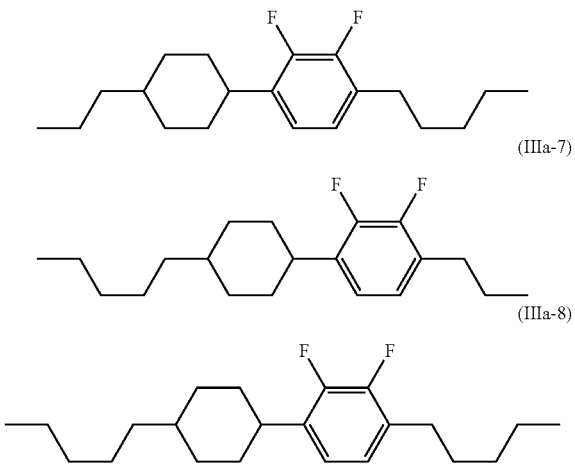

(IIIa-6)

(IIIa-7)

(IIIa-8)

more preferably selected from the group consisting of compounds represented by Formulae (IIIa-1) to (IIIa-4), further preferably selected from the group consisting of compounds represented by Formulae (IIIa-1), (IIIa-3), and (IIIa-4), and especially preferably selected from the group consisting of compounds represented by Formulae (IIIa-1) and (IIIa-4).

The amount of a compound represented by General Formula (IIIa) is preferably in the range of 3 to 30 mass %, more preferably 3 to 28 mass %, further preferably 3 to 25 mass %, especially preferably 3 to 23 mass %, and most preferably 3 to 20 mass %.

In the case where four or more compounds represented by General Formula (IIIa) are used, compounds represented by Formulae (IIIa-1) to (IIIa-4) are preferably used in combination, and the amount of the compounds represented by Formulae (IIIa-1) to (IIIa-4) is preferably not less than 50 mass %, more preferably not less than 70 mass %, further preferably not less than 80 mass %, and especially preferably not less than 90 mass % relative to all of the compounds represented by General Formula (IIIa).

In the case where three compounds represented by General Formula (IIIa) are used, compounds represented by Formulae (IIIa-1), (IIIa-2), and (IIIa-4) are preferably used in combination, and the amount of the compounds represented by Formulae (IIIa-1), (IIIa-2), and (IIIa-4) is preferably not less than 50 mass %, more preferably not less than 70 mass %, further preferably not less than 80 mass %, and especially preferably not less than 90 mass % relative to all of the compounds represented by General Formula (IIIa).

In the case where two compounds represented by General Formula (IIIa) are used, compounds represented by Formulae (IIIa-1) and (IIIa-4) are preferably used in combination, and the amount of the compounds represented by Formulae (IIIa-1) and (IIIa-4) is preferably not less than 50 mass %, more preferably not less than 70 mass %, further preferably not less than 80 mass %, and especially preferably not less than 90 mass % relative to all of the compounds represented by General Formula (IIIa).

In the case where $A^1$ in the compound represented by General Formula (III) is a 1,4-phenylene group, such a compound can be represented by General Formula (IIIb):

[Chem. 7]

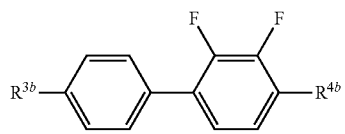
(IIIb)

(where $R^{3b}$ and $R^{4b}$ each represent the same group as specified for $R^3$ and $R^4$ in General Formula (III)); the compound represented by General Formula (IIIb) is preferably selected from the group consisting of compounds represented by Formulae (IIIb-1) to (IIIb-8),

[Chem. 8]

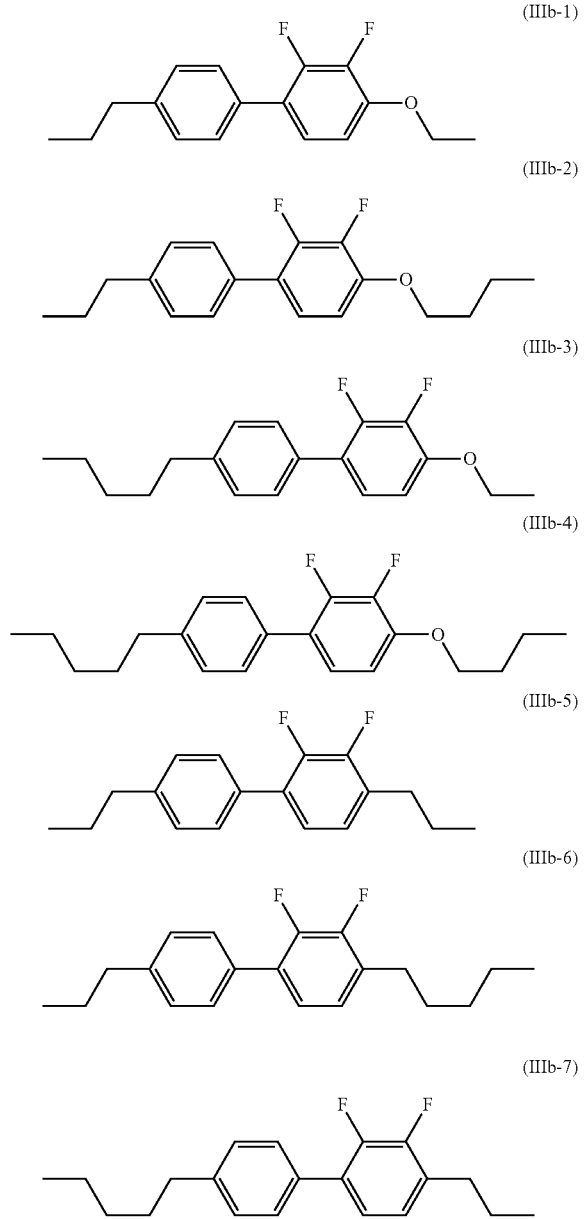

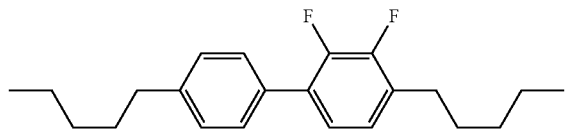
(IIIb-8)

more preferably selected from the group consisting of compounds represented by Formulae (IIIb-1) to (IIIb-4), further preferably selected from the group consisting of compounds represented by Formulae (IIIb-1) and (IIIb-3), and especially preferably a compound represented by Formula (IIIb-1).

The amount of a compound represented by General Formula (IIIb) is preferably in the range of 1 to 20 mass %, more preferably 2 to 15 mass %, further preferably 3 to 18 mass %, and especially preferably 5 to 15 mass %.

In the case where four or more compounds represented by General Formula (IIIb) are used, compounds represented by Formulae (IIIb-1) to (IIIb-4) are preferably used in combination, the amount of the compounds represented by Formulae (IIIb-1) to (IIIb-4) is preferably not less than 50 mass %, more preferably not less than 70 mass %, further preferably not less than 80 mass %, and especially preferably not less than 90 mass % relative to all of the compounds represented by General Formula (IIIb).

In the case where three compounds represented by General Formula (IIIb) are used, compounds represented by Formulae (IIIb-1) to (IIIb-3) are preferably used in combination, the amount of the compounds represented by Formulae (IIIb-1) to (IIIb-3) is preferably not less than 50 mass %, more preferably not less than 70 mass %, further preferably not less than 80 mass %, and especially preferably not less than 90 mass % relative to all of the compounds represented by General Formula (IIIb).

In the case where two compounds represented by General Formula (IIIb) are used, compounds represented by Formulae (IIIb-1) and (IIIb-3) are preferably used in combination, the amount of the compounds represented by Formulae (IIIb-1) and (IIIb-3) is preferably not less than 50 mass %, more preferably not less than 70 mass %, further preferably not less than 80 mass %, and especially preferably not less than 90 mass % relative to all of the compounds represented by General Formula (IIIb).

The liquid crystal composition of the present invention can further contain a compound selected from the group consisting of compounds represented by General Formula (IV):

[Chem. 9]

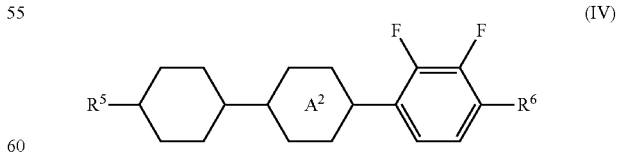
(IV)

(where $R^5$ and $R^6$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; at least one hydrogen atom of the alkyl group, alkenyl group, alkoxy group, and/or alkenyloxy group is optionally substituted with a fluorine atom; the methylene group of the alkyl group, alkenyl group, alkoxy group, and/or alkenyloxy group is optionally substituted with an oxygen atom provided that the oxygen atom is not bonded to another oxygen atom in series or substituted with a carbonyl group provided that the carbonyl group is not bonded to another carbonyl group in series; $A^2$ represents a 1,4-cyclohexylene group, a 1,4-phenylene group, or a tetrahydropyran-2,5-diyl group; and in the case where $A^2$ represents a 1,4-phenylene group, at least one hydrogen atom of the 1,4-phenylene group is optionally substituted with a fluorine atom).

In the compound represented by General Formula (IV), $R^5$ and $R^6$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^5$ is preferably an alkyl group having 1 to 8 carbon atoms or an alkenyl group having 2 to 8 carbon atoms, more preferably an alkyl group having 1 to 8 carbon atoms, and further preferably an alkyl group having 2 to 5 carbon atoms; $R^6$ is preferably an alkyl group having 1 to 8 carbon atoms or an alkoxy group having 1 to 8 carbon atoms, more preferably an alkoxy group having 1 to 8 carbon atoms, and further preferably an alkoxy group having 2 to 5 carbon atoms.

In the compound represented by General Formula (IV), $A^2$ represents a 1,4-cyclohexylene group, a 1,4-phenylene group, or a tetrahydropyran-2,5-diyl group, and preferably a 1,4-cyclohexylene group or a 1,4-phenylene group; in the case where $A^2$ is a 1,4-phenylene group, at least one hydrogen atom of the 1,4-phenylene group is optionally substituted with a fluorine atom, at most three hydrogen atoms are preferably substituted with fluorine atoms, at most two hydrogen atoms are more preferably substituted with fluorine atoms, one hydrogen atom is further preferably substituted with a fluorine atom, and the 1,4-phenylene group is especially preferably unsubstituted.

In the case where $A^2$ in the compound represented by General Formula (IV) is a 1,4-cyclohexylene group, such a compound can be represented by General Formula (IVa):

[Chem. 10]

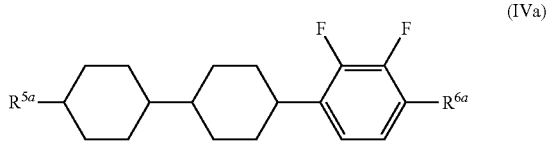

(IVa)

(where $R^{5a}$ and $R^{6a}$ each represent the same group as specified for $R^5$ and $R^6$ in General Formula (IV); the compound represented by General Formula (IVa) is preferably selected from the group consisting of compounds represented by Formulae (IVa-1) to (IVa-6),

[Chem. 11]

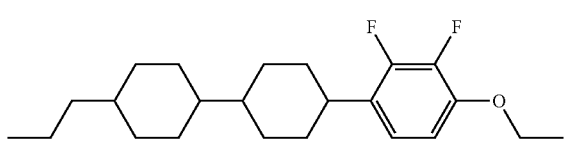

(IVa-1)

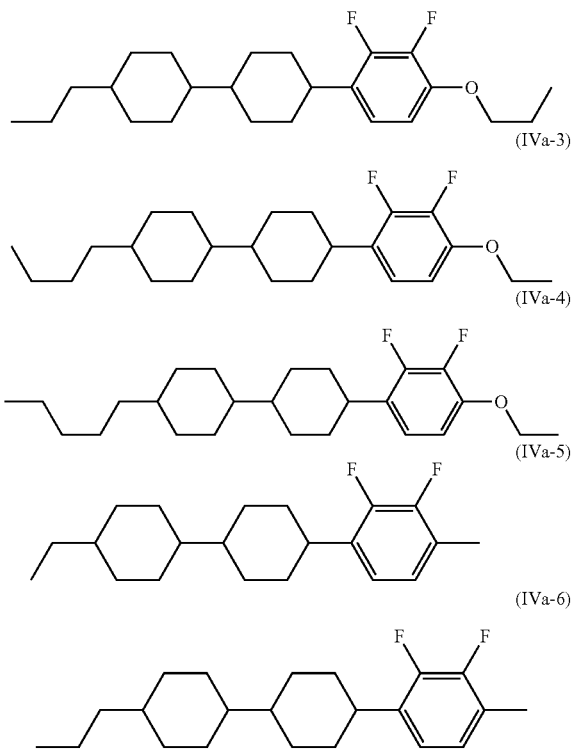

more preferably selected from the group consisting of compounds represented by Formulae (IVa-1) to (IVa-4), further preferably selected from the group consisting of compounds represented by Formulae (IVa-1) to (IVa-3), and especially preferably selected from the group consisting of compounds represented by Formulae (IVa-1) and (IVa-3).

In the case where the liquid crystal composition of the present invention needs to have a high nematic-isotropic phase transition temperature ($T_{ni}$), at least one compound is preferably selected from the group consisting of compounds represented by Formulae (IVa-5) and (IVa-6).

In the case where four or more compounds represented by General Formula (IVa) are used, compounds represented by Formulae (IVa-1) to (IVa-4) are preferably used in combination, and the amount of the compounds represented by Formulae (IVa-1) to (IVa-4) is preferably not less than 50 mass %, more preferably not less than 70 mass %, further preferably not less than 80 mass %, and especially preferably not less than 90 mass % relative to all of the compounds represented by General Formula (IVa).

In the case where three compounds represented by General Formula (IVa) are used, compounds represented by Formulae (IVa-1) to (IVa-3) are preferably used in combination, and the amount of the compounds represented by Formulae (IVa-1) to (IVa-3) is preferably not less than 50 mass %, more preferably not less than 70 mass %, further preferably not less than 80 mass %, and especially preferably not less than 90 mass % relative to all of the compounds represented by General Formula (IVa).

In the case where two compounds represented by General Formula (IVa) are used, compounds represented by Formulae (IVa-1) and (IVa-3) are preferably used in combination, and the amount of the compounds represented by Formulae (IVa-1) and (IVa-3) is preferably not less than 50 mass %, more preferably not less than 70 mass %, further preferably not less than 80 mass %, and especially preferably not less than 90 mass % relative to all of the compounds represented by General Formula (IVa).

In the case where $A^2$ in the compound represented by General Formula (IV) is a 1,4-phenylene group, such a compound can be represented by General Formula (IVb):

[Chem. 12]

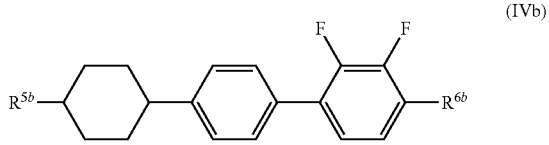

(IVb)

(where $R^{5b}$ and $R^{6b}$ each represent the same group as specified for $R^5$ and $R^6$ in General Formula (IV); the compound represented by General Formula (IVb) is preferably selected from the group consisting of compounds represented by Formulae (IVb-1) to (IVb-4), and

[Chem. 13]

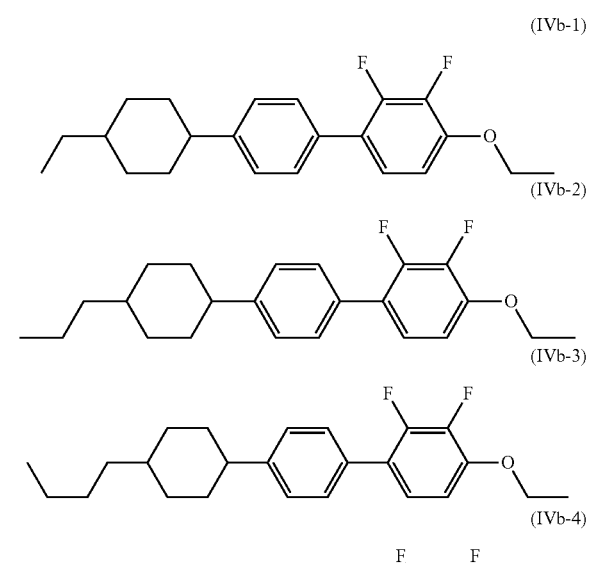

more preferably selected from the group consisting of compounds represented by Formulae (IVb-1) and (IVb-2).

In the case where two or more compounds represented by General Formula (IVb) are used, compounds represented by Formulae (IVb-1) and (IVb-2) are preferably used in combination, and the amount of the compounds represented by Formulae (IVb-1) and (IVb-2) is preferably not less than 50 mass %, more preferably not less than 70 mass %, further preferably not less than 80 mass %, and especially preferably not less than 90 mass % relative to all of the compounds represented by General Formula (IVb).

The liquid crystal composition of the present invention can further contain a compound selected from the group consisting of compounds represented by General Formula (V):

[Chem. 14]

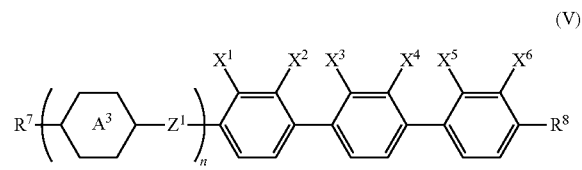

(V)

(where $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; at least one hydrogen atom of the alkyl group, alkenyl group, alkoxy group, and/or alkenyloxy group is optionally substituted with a fluorine atom; the methylene group of the alkyl group, alkenyl group, alkoxy group, and/or alkenyloxy group is optionally substituted with an oxygen atom provided that the oxygen atom is not bonded to another oxygen atom in series or substituted with a carbonyl group provided that the carbonyl group is not bonded to another carbonyl group in series;

$A^3$ represents a 1,4-cyclohexylene group, a 1,4-phenylene group, or a tetrahydropyran-2,5-diyl group; in the case where $A^3$ represents a 1,4-phenylene group, at least one hydrogen atom of the 1,4-phenylene group is optionally substituted with a fluorine atom;

$Z^1$ represents a single bond, —CH$_2$CH$_2$—, —OCH$_2$—, —OCF$_2$—, —CH$_2$O—, or CF$_2$O—;

n represents 0 or 1; and $X^1$ to $X^6$ each independently represents a hydrogen atom or fluorine atom, and at least one of $X^1$ to $X^6$ represents a fluorine atom).

In particular, the compound represented by General Formula (V) is preferably a compound represented by any of General Formulae (V-1) to (V-16):

[Chem. 15]

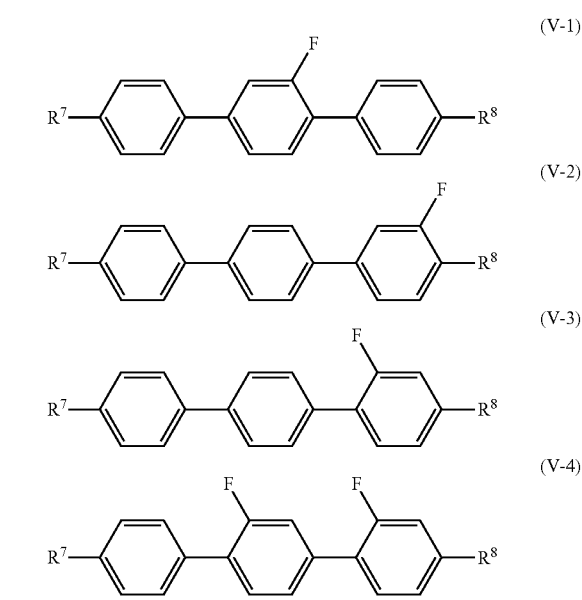

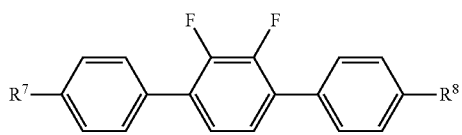 (V-5)

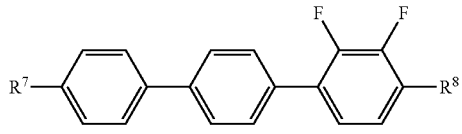 (V-6)

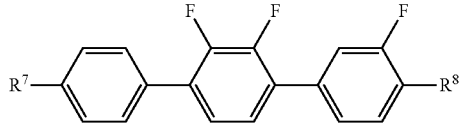 (V-7)

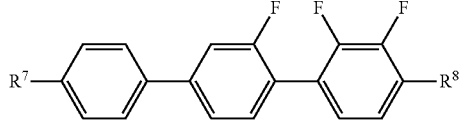 (V-8)

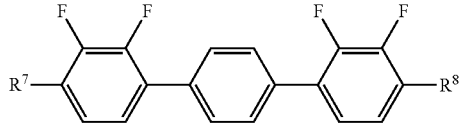 (V-9)

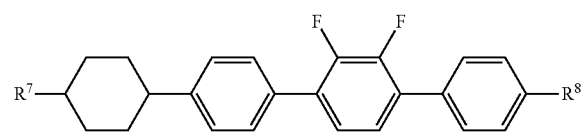 (V-10)

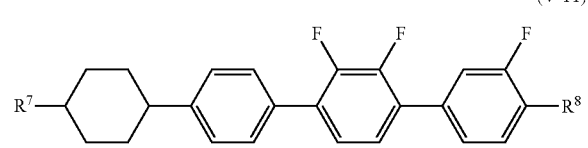 (V-11)

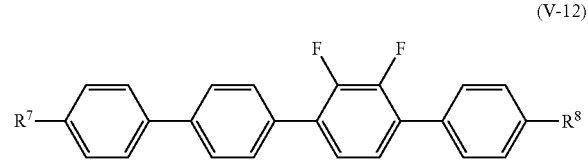 (V-12)

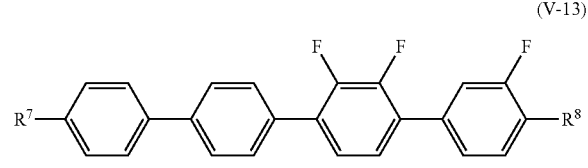 (V-13)

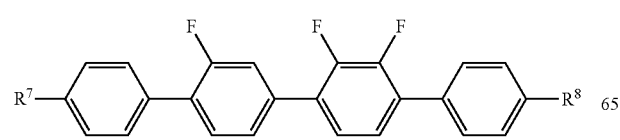 (V-14)

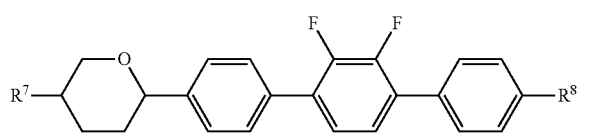 (V-15)

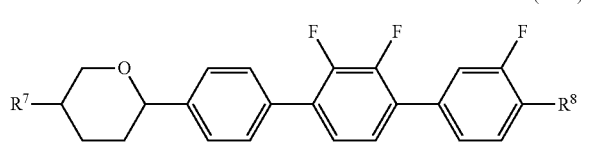 (V-16)

(where $R^7$ and $R^8$ each represent the same group as specified for $R^7$ and $R^8$ in General Formula (V));

more preferably any of Formulae (V-1), (V-3) to (V-9), and (V-12) to (V-15); further preferably any of Formulae (V-1), (V-3), (V-5), (V-6), (V-9), (V-12), and (V-15); especially preferably any of Formulae (V-1), (V-5), and (V-6); and most preferably Formula (V-5).

In the case where compounds represented by General Formula (V) are used, a compound represented by Formula (V-5) is preferably employed; the amount of the compound represented by Formula (V-5) is preferably not less than 50 mass %, more preferably not less than 70 mass %, and further preferably not less than 80 mass % relative to all of the compounds represented by General Formula (V).

In General Formula (V), $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atom; in particular, $R^7$ and $R^8$ are each preferably an alkyl group having 1 to 8 carbon atoms or an alkenyl group having 2 to 8 carbon atoms, more preferably an alkyl group having 2 to 5 carbon atoms or an alkenyl group having 2 to 5 carbon atoms, and further preferably an alkyl group having 2 to 5 carbon atoms. $R^7$ and $R^8$ are also preferably linear. In the case where each of $R^7$ and $R^8$ is an alkyl group, it is preferred that the number of carbon atoms in $R^7$ be different from that in $R^8$.

Further in particular, a compound in which $R^7$ represents a propyl group and in which $R^8$ represents an ethyl group or a compound in which $R^7$ represents a butyl group and in which $R^8$ represents an ethyl group is preferred.

In addition, the liquid crystal composition of the present invention can further contain a compound selected from the group consisting of compounds represented by General Formulae (VI-a) to (VI-e):

[Chem. 16]

 (VI-a)

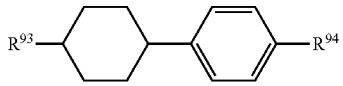 (VI-b)

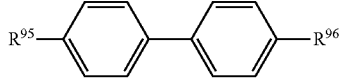 (VI-c)

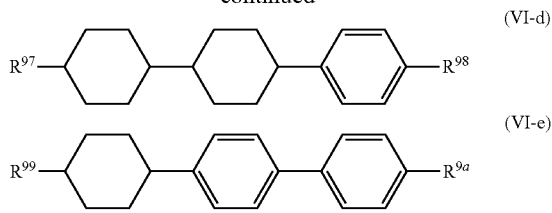

(where $R^{91}$ to $R^{9a}$ each independently represent an alkyl group having 1 to 10 carbon atoms, an alkoxy group having 1 to 10 carbon atoms, or an alkenyl group having 2 to 10 carbon atoms; and the following compounds represented by General Formula (VI-a) are excluded: a compound in which $R^{91}$ represents an alkyl group having 3 carbon atoms and in which $R^{92}$ represents an alkenyl group having 2 carbon atoms, a compound in which $R^{91}$ represents an alkyl group having 3 carbon atoms and in which $R^{92}$ represents a 1-propenyl group, a compound in which $R^{91}$ represents an alkyl group having 2 carbon atoms and in which $R^{92}$ represents a 1-propenyl group, a compound in which $R^{91}$ represents an alkyl group having 3 carbon atoms and in which $R^{92}$ represents an alkyl group having 2 to 5 carbon atoms, and a compound in which $R^{91}$ represents an alkyl group having 3 carbon atoms and in which $R^{92}$ represents an alkoxy group having 1 to 4 carbon atoms).

In the case where the liquid crystal composition contains a compound selected from the group consisting of compounds represented by General Formulae (VI-a) to (VI-e), the liquid crystal composition preferably contains one to ten compounds selected therefrom, more preferably one to eight compounds, and especially preferably one to five compounds; furthermore, the liquid crystal composition also preferably contains two or more compounds or one compound selected therefrom. The amount of a compound selected from the group consisting of compounds represented by General Formulae (VI-a) to (VI-e) is preferably in the range of 1 to 20 mass %, more preferably 1 to 15 mass %, and especially preferably 2 to 10 mass %.

$R^{91}$ to $R^{9a}$ preferably each independently represent an alkyl group having 1 to 10 carbon atoms, an alkenyl group having 2 to 10 carbon atoms, or an alkoxy group having 2 to 10 carbon atoms; and more preferably an alkyl group having 1 to 5 carbon atoms, an alkenyl group having 2 to 5 carbon atoms, or an alkoxy group having 2 to 5 carbon atoms. In the case where $R^{91}$ to $R^{9a}$ each represent an alkenyl group, a structure represented by any of Formulae (i) to (iv) is preferably employed:

[Chem. 17]

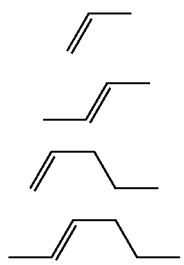

(where the right end of each structure is bonded to the ring structure).

In the case where the liquid crystal composition of the present invention contains a reactive monomer, structures represented by Formulae (ii) and (iv) are preferred, and a structure represented by Formula (ii) is more preferred.

$R^{91}$ and $R^{92}$ may be the same as or different from each other; however, it is preferred that $R^{91}$ and $R^{92}$ represent different groups.

In particular, from these standpoints, preferred examples of the compounds represented by Formulae (VI-a) to (VI-e) include the following compounds.

[Chem. 18]

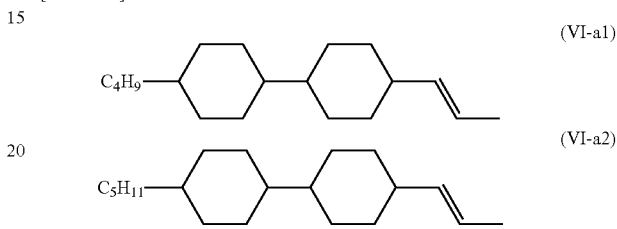

[Chem. 19]

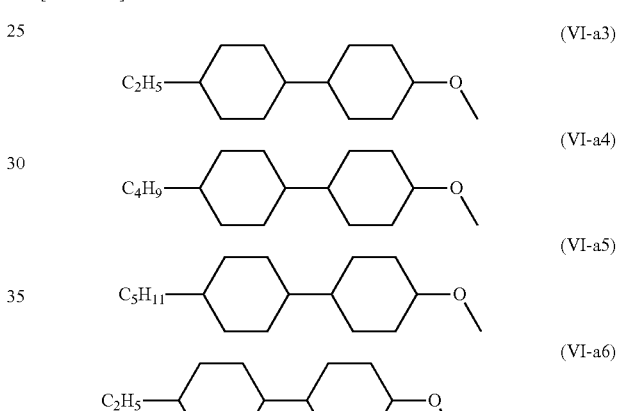

[Chem. 20]

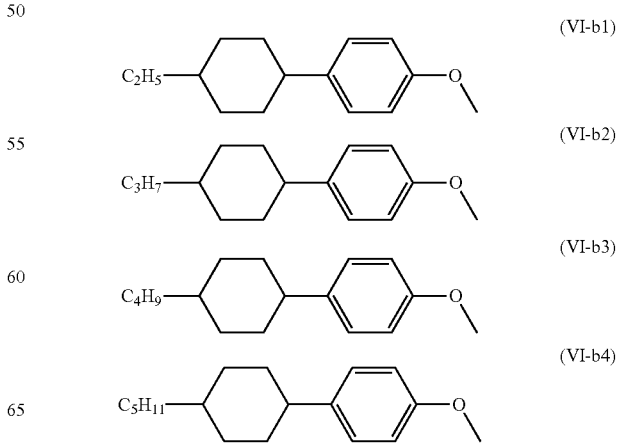

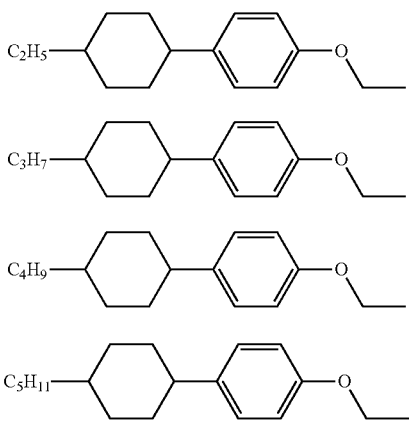

[Chem. 21]

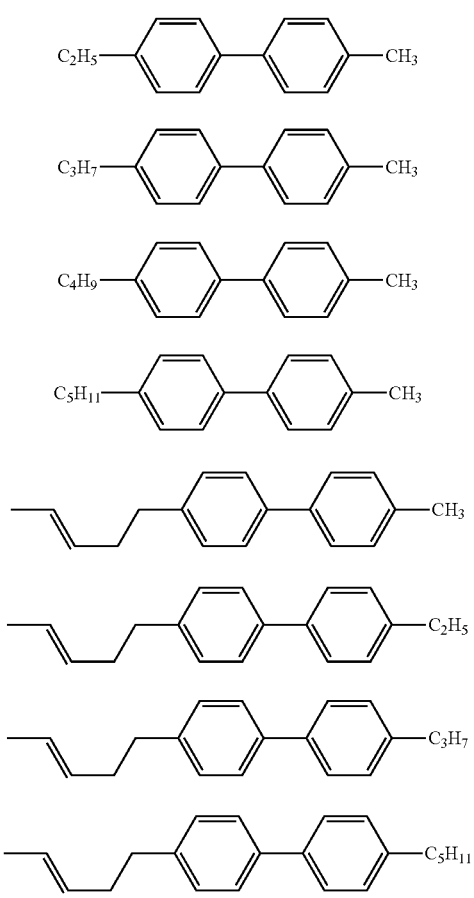

[Chem. 22]

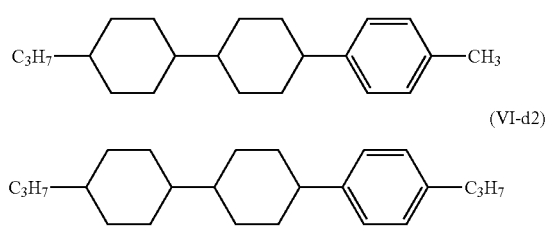

[Chem. 23]

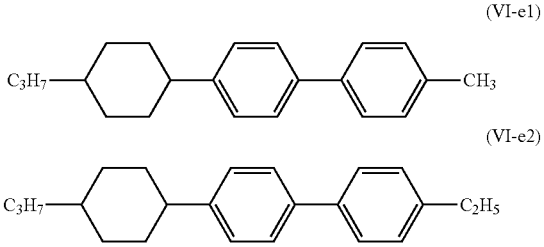

Among these, compounds represented by Formulae (VI-a1), (VI-a2), (VI-b2), (VI-b6), (VI-c2), (II-c4), (VI-c5), (VI-d1), (VI-d2), and (VI-e2) are preferred.

A compound represented by General Formula (VI) has a dielectric anisotropy that is approximately zero and therefore similar to compounds represented by Formulae (I-1), (I-2), and (I-3) and General Formula (II) in this regard. The relationship between the amount of a compound represented by General Formula (VI) and the amounts of compounds represented by Formulae (I-1), (I-2), and (I-3) and General Formula (II) is as follows: the total amount of compounds represented by Formulae (I-1), (I-2), and (I-3) and General Formula (II) is preferably in the range of 60 to 85 mass %, more preferably 60 to 90 mass %, and especially preferably 60 to 95 mass % relative to the total amount of compounds represented by Formulae (I-1), (I-2), and (I-3) and General Formula (II) and a compound represented by General Formula (VI) in the liquid crystal composition. The total amount of compounds represented by Formulae (I-1), (I-2), and (I-3) and General Formulae (II) and (VI) is preferably in the range of 15 to 70 mass %, more preferably 20 to 65 mass %, further preferably 25 to 60 mass %, still further preferably 30 to 55 mass %, and especially preferably 35 to 50 mass % relative to the amount of the whole of the liquid crystal composition.

In the present invention, a 1,4-cyclohexyl group is preferably a trans-1,4-cyclohexyl group.

In the liquid crystal composition of the present invention, compounds represented by Formula (I-1) and General Formula (II) are essential components; in addition, the liquid crystal composition can contain compounds represented by Formulae (I-2) and (I-3) and General Formulae (III), (IV), (V), and (VI-a) to (VI-e). The lower limit of the total amount of the compounds represented by Formulae (I-1), (I-2), and (I-3) and General Formulae (II), (III), (IV), (V), and (VI-a) to (VI-e) in the liquid crystal composition is preferably 60 mass %, more preferably 65 mass %, still more preferably 70 mass %, even still more preferably 75 mass %, further preferably 80 mass %, still further preferably 85 mass %, even still further preferably 90 mass %, even still further preferably 92 mass %, even still further preferably 95 mass %, even still further preferably 98 mass %, and even still further preferably 99 mass %; and the upper limit thereof is preferably 100 mass %, and more preferably 99.5 mass %.

In particular, the total amount of compounds represented by Formula (I-1) and General Formula (II) is preferably in the range of 20 to 50 mass %, more preferably 25 to 45 mass %, and further preferably 28 to 42 mass %.

The total amount of compounds represented by Formula (I-1) and Formulae (II-1) is preferably in the range of 10 to 50 mass %, more preferably 15 to 45 mass %, and further preferably 18 to 42 mass %.

In the case where a compound represented by General Formula (III) is used, the total amount of the compounds represented by Formulae (I-1) and (II-1) and General Formula (III) is preferably in the range of 10 to 50 mass %, more preferably 15 to 45 mass %, and further preferably 18 to 42 mass %.

In the case where a compound represented by General Formula (IV) is used, the total amount of the compounds represented by Formulae (I-1) and (II-1) and General Formula (IV) is preferably in the range of 50 to 80 mass %, more preferably 45 to 75 mass %, and further preferably 46 to 73 mass %.

In the case where a compound represented by General Formula (V) is used, the total amount of the compounds represented by Formulae (I-1) and (II-1) and General Formula (V) is preferably in the range of 20 to 65 mass %, more preferably 25 to 60 mass %, and further preferably 30 to 55 mass %.

In the case where compounds represented by General Formulae (III) and (IV) are used, the total amount of the compounds represented by Formulae (I-1) and (II-1) and General Formulae (III) and (IV) is preferably in the range of 55 to 99 mass %, more preferably 60 to 95 mass %, and further preferably 65 to 90 mass %.

In the case where compounds represented by General Formulae (III) and (V) are used, the total amount of the compounds represented by Formulae (I-1) and (II-1) and General Formulae (III) and (V) is preferably in the range of 35 to 80 mass %, more preferably 40 to 75 mass %, and further preferably 45 to 70 mass %.

In the case where compounds represented by General Formulae (IV) and (V) are used, the total amount of the compounds represented by Formulae (I-1) and (II-1) and General Formulae (IV) and (V) is preferably in the range of 50 to 95 mass %, more preferably 55 to 90 mass %, and further preferably 58 to 86 mass %.

In the case where compounds represented by General Formulae (III), (IV), and (V) are used, the total amount of the compounds represented by Formulae (I-1) and (II-1) and General Formulae (III), (IV), and (V) is preferably in the range of 65 to 100 mass %, more preferably 70 to 100 mass %, and further preferably 75 to 100 mass %.

It is preferred that the liquid crystal composition of the present invention be free from a compound having a molecular structure in which oxygen atoms are bonded to each other, such as the structure of a peroxy acid (—CO—OO—).

In view of the reliability and long-term stability of the liquid crystal composition, the amount of a compound having a carbonyl group is preferably not more than 5 mass %, more preferably not more than 3 mass %, and further preferably not more than 1 mass % relative to the total mass of the liquid crystal composition; however, it is most preferred that the liquid crystal composition be substantially free from such a compound.

In view of stability to irradiation with UV, the amount of a compound substituted with a chlorine atom is preferably not more than 15 mass %, more preferably not more than 10 mass %, and further preferably not more than 5 mass % relative to the total mass of the composition; it is most preferred that the composition be substantially free from such a compound.

It is preferred that the amount of compounds having molecules in which all of the ring structures are six-membered rings be large. The amount of compounds having molecules in which all of the ring structures are six-membered rings is preferably not less than 80 mass %, more preferably not less than 90 mass %, and further preferably not less than 95 mass % relative to the total mass of the composition; it is most preferred that the liquid crystal composition be substantially composed of only compounds having molecules in which all of the ring structures are six-membered rings.

In order to reduce degradation of the liquid crystal composition due to oxidation thereof, it is preferred that the amount of a compound having a cyclohexenylene group that is a ring structure be small. The amount of a compound having a cyclohexenylene group is preferably not more than 10 mass %, and more preferably not more than 5 mass % relative to the total mass of the composition. It is further preferred that the liquid crystal composition be substantially free from a compound having a cyclohexenylene group.

In view of improvement of viscosity and $T_{ni}$, it is preferred that the amount of a compound having molecules containing a 2-methylbenzene-1,4-diyl group in which a hydrogen atom is optionally substituted with a halogen be small. The amount of the compound having molecules containing such a 2-methylbenzene-1,4-diyl group is preferably not more than 10 mass %, and more preferably not more than 5 mass % relative to the total mass of the composition. It is further preferred that the composition be substantially free from such a compound.

In the case where a compound contained in the composition of the first embodiment of the present invention has a side chain that is an alkenyl group and where the alkenyl group is bonded to cyclohexane, the alkenyl group preferably has 2 to 5 carbon atoms; in the case where the alkenyl group is bonded to benzene, the alkenyl group preferably has 4 or 5 carbon atoms, and it is preferred that the unsaturated bond of the alkenyl group be not directly connected to the benzene.

The dielectric anisotropy $\Delta\varepsilon$ of the liquid crystal composition of the present invention at 25° C. is preferably in the range of −2.0 to −6.0, more preferably −2.5 to −5.0, and especially preferably −2.5 to −4.0; in particular, the dielectric anisotropy $\Delta\varepsilon$ is preferably in the range of −2.5 to −3.4 in view of response speed and −3.4 to −4.0 in view of a driving voltage.

The refractive index anisotropy Δn of the liquid crystal composition of the present invention at 25° C. is preferably in the range of 0.08 to 0.13, and more preferably 0.09 to 0.12. In particular, the refractive index anisotropy Δn is preferably in the range of 0.10 to 0.12 for a thin cell gap and 0.08 to 0.10 for a thick cell gap.

The rotational viscosity ($\gamma_1$) of the liquid crystal composition of the present invention is preferably not more than 150, more preferably not more than 130, and especially preferably not more than 120.

In the liquid crystal composition of the present invention, the function Z of rotational viscosity and refractive index anisotropy preferably shows a specific value:

$$Z = \frac{\gamma 1}{(\Delta n)^2} \qquad [\text{Math. 1}]$$

(where $\gamma_1$ represents rotational viscosity, and Δn represents refractive index anisotropy).

Z is preferably not more than 13000, more preferably not more than 12000, and especially preferably not more than 11000.

In the case where the liquid crystal composition of the present invention is used in an active-matrix display device, the specific resistance of the liquid crystal composition needs to be not less than $10^{12}$ (Ω·m), preferably $10^{13}$ (Ω·m) and more preferably not less than $10^{14}$ (Ω·m).

The liquid crystal composition of the present invention may contain, depending on applications thereof, general nematic liquid crystal, smectic liquid crystal, cholesteric liquid crystal, antioxidant, ultraviolet absorber, and polymerizable monomer in addition to the above-mentioned compounds. In the case where the liquid crystal composition needs to be chemically stable, it is preferred that the molecules thereof be free from a chlorine atom; in the case where the liquid crystal composition needs to be stable to light such as ultraviolet, it is preferred that the molecules thereof be free from a condensed ring having a long conjugation length and showing an absorption peak in an ultraviolet region, such as a naphthalene ring.

The polymerizable monomer is preferably a divalent monomer represented by General Formula (VII):

[Chem. 24]

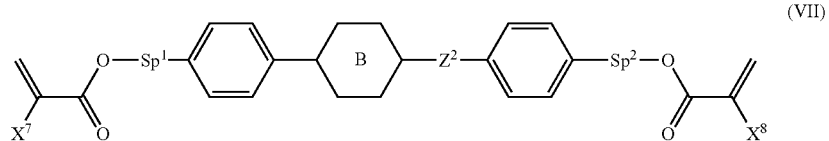

(VII)

(where $X^7$ and $X^8$ each independently represent a hydrogen atom or a methyl group;

$Sp^1$ and $Sp^2$ each independently represent a single bond, an alkylene group having 1 to 8 carbon atoms, or —O—$(CH_2)_s$— (where s is an integer from 2 to 7, and the oxygen atom is bonded to an aromatic ring);

$Z^2$ represents —OCH$_2$—, —CH$_2$O—, —COO—, —OCO—, —CF$_2$O—, —OCF$_2$—, —CH$_2$CH$_2$—, —CF$_2$CF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$═CY$^2$— (where $Y^1$ and $Y^2$ each independently represent a fluorine atom or a hydrogen atom), —C≡C—, or a single bond; and B represents a 1,4-phenylene group, a trans-1,4-cyclohexylene group, or a single bond, and in each 1,4-phenylene group in the formula, any hydrogen atom is optionally substituted with a fluorine atom).

Diacrylate derivatives in which $X^7$ and $X^8$ each represent a hydrogen atom and dimethacrylate derivatives in which $X^7$ and $X^8$ are each a methyl group are preferred, and compounds in which one of $X^7$ and $X^8$ represents a hydrogen atom and in which the other one thereof represents a methyl group are also preferred. Among these compounds, the rate of polymerization is the highest in diacrylate derivatives and the lowest in dimethacrylate derivatives, and the rate of polymerization of unsymmetrical compounds is intermediate therebetween. Hence, an appropriate compound can be employed on the basis of an intended application. In PSA display devices, dimethacrylate derivatives are especially preferred.

$Sp^1$ and $Sp^2$ each independently represent a single bond, an alkylene group having 1 to 8 carbon atoms, or —O—$(CH_2)_s$—; in an application to PSA display devices, at least one of $Sp^1$ and $Sp^2$ is preferably a single bond, and compounds in which $Sp^1$ and $Sp^2$ each represent a single bond and compounds in which one of $Sp^1$ and $Sp^2$ is a single bond and in which the other one thereof represents an alkylene group having 1 to 8 carbon atoms or —O—$(CH_2)_s$— are preferred. In this case, an alkyl group having 1 to 4 carbon atoms is preferably employed, and s preferably ranges from 1 to 4.

$Z^1$ is preferably —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably —COO—, —OCO—, or a single bond, and especially preferably a single bond.

B represents a 1,4-phenylene group in which any hydrogen atom is optionally substituted with a fluorine atom, a trans-1,4-cyclohexylene group, or a single bond; and a 1,4-phenylene group and a single bond are preferred. In the case where B does not represent a single bond but represents a ring structure, $Z^2$ is also preferably a linking group as well as a single bond; in the case where B represents a single bond, $Z^1$ is preferably a single bond.

From these viewpoints, a preferred ring structure between $Sp^1$ and $Sp^2$ in General Formula (VII) is particularly as follows.

In General Formula (VII), in the case where B represents a single bond and where the cyclic structure consists of two rings, the ring structure is preferably represented by any of Formulae (VIIa-1) to (VIIa-5):

[Chem. 25]

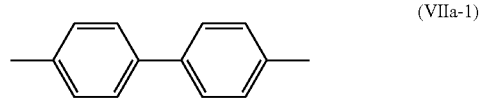

(VIIa-1)

(VIIa-2)

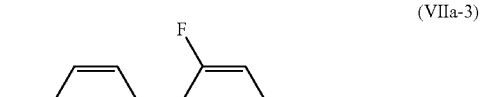

(VIIa-3)

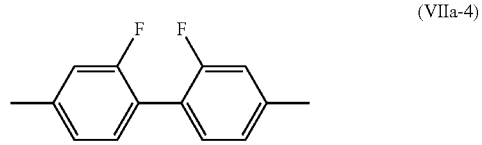

(VIIa-4)

-continued

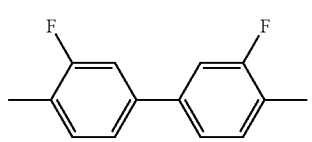
(VIIa-5)

(where the two ends of each structure are connected to Sp¹ and Sp², respectively), more preferably Formulae (VIIa-1) to (VIIa-3), and especially preferably Formula (VIIa-1).

Polymerizable compounds having such skeletons enable alignment regulation optimum for PSA liquid crystal display devices after polymerization thereof, which enables a good alignment state; hence, uneven display is reduced or eliminated.

Accordingly, the polymerizable monomer is especially preferably represented by any of General Formulae (VII-1) to (VII-4), and most preferably General Formula (VII-2):

[Chem. 26]

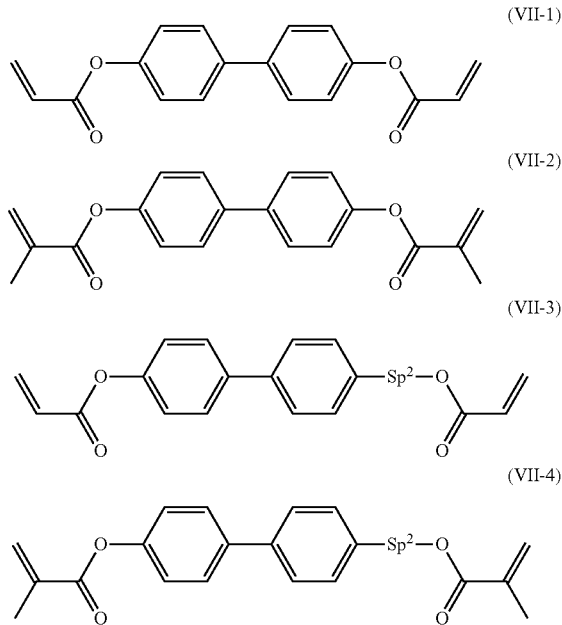

(where Sp² represents an alkylene group having 2 to 5 carbon atoms).

In the case where the monomer is added to the liquid crystal composition of the present invention, polymerization is carried out even without a polymerization initiator; however, a polymerization initiator may be used to promote the polymerization. Examples of the polymerization initiator include benzoin ethers, benzophenones, acetophenones, benzyl ketals, and acyl phosphine oxides. In order to enhance storage stability, a stabilizer may be added. Examples of usable stabilizers include hydroquinones, hydroquinone monoalkylethers, tertiary butylcatechol, pyrogallols, thiophenols, nitro compounds, β-naphthylamines, β-naphthols, and nitroso compounds.

The polymerizable-compound-containing liquid crystal composition of the present invention is useful in liquid crystal display devices, and especially useful in liquid crystal display devices driven by an active matrix; hence, such a liquid crystal composition can be used in liquid crystal display devices of a PSA mode, PSVA mode, VA mode, IPS mode, and ECB mode.

The polymerizable compound contained in the polymerizable-compound-containing liquid crystal composition of the present invention is polymerized by being irradiated with ultraviolet with the result that liquid crystal molecules can be aligned, and such a liquid crystal composition is used in liquid crystal display devices in which the birefringence of the liquid crystal composition is utilized to control the amount of light that is to be transmitted. Such a liquid crystal composition is useful in liquid crystal display devices, such as an AM-LCD (active matrix liquid crystal display device), a TN (twisted nematic liquid crystal display device), an STN-LCD (super twisted nematic liquid crystal display device), an OCB-LCD, and an IPS-LCD (in-plane switching liquid crystal display device), particularly useful in an AM-LCD, and can be used in transmissive or reflective liquid crystal display devices.

With reference to illustration in FIGS. 1 to 4 and a liquid crystal display device which will be described later, two substrates 2 and 8 of a liquid crystal cell included in a liquid crystal display device can be made of a transparent material having flexibility, such as glass or a plastic material, and one of these substrates may be made of a non-transparent material such as silicon. Transparent substrates 2 and 8 have transparent electrodes (layers) 6 and 14, respectively, and they can be produced by, for example, sputtering indium tin oxide (ITO) on transparent substrates such as glass plates 2 and 8.

After formation of the transparent electrodes (layers) and TFTs, the substrates 2 and 8 are arranged so as to face each other such that the transparent electrodes (layers) 6 and 14 are disposed therebetween. In the arrangement of the substrates, a spacer (not illustrated) may be disposed between the substrates to adjust the distance therebetween (see FIGS. 1 to 4). In this case, the distance between the substrates is preferably adjusted such that the thickness of a light modulating layer to be formed is in the range of 1 to 100 μm, and more preferably 1.5 to 10 μm. In the case where a polarizing plate is used, the product of the refractive index anisotropy Δn of liquid crystal and a cell thickness d is preferably adjusted to achieve the maximum contrast. In the case where two polarizing plates 1 and 9 are used, the polarization axis of each polarizing plate can be adjusted to give a good viewing angle or contrast (see FIGS. 1 to 4). Furthermore, a retardation film can be also used to increase a viewing angle. The spacer is formed of, for instance, glass particles, plastic particles, alumina particles, and photoresist materials. A sealing material such as a thermosetting epoxy composition is subsequently applied to the substrates by screen printing in a state in which a liquid-crystal-injection port has been formed, and the substrates are attached to each other, and then the sealing material is heated to be thermally cured.

Into the liquid-crystal-composition-holding space which has been formed to hold a liquid crystal composition between the two substrates that have been attached so as to face each other as described above, the polymerizable monomer-containing liquid crystal composition can be introduced by a general vacuum injection technique or ODF technique; however, a vacuum injection technique has a problem in which traces of injection remain while droplet stains are not generated. The present invention can be suitably applied to display devices manufactured by an ODF technique.

Since a proper polymerization rate is desirable to enable liquid crystal molecules to be aligned in a good manner, the polymerizable compound is preferably polymerized by being irradiated with one of active energy rays, such as an ultraviolet ray and an electron beam, or by being irradiated with such active energy rays used in combination or in sequence. In the use of an ultraviolet ray, a polarized light source or a non-polarized light source may be used. In the case where the polymerizable-compound-containing liquid crystal composition is polymerized in a state in which the composition is disposed between the two substrates, at least the substrate on the side from which active energy rays are emitted needs to have transparency suitable for the active energy rays. Another technique may be used, in which only the intended part is polymerized by being irradiated with light with a mask, the alignment state of the non-polymerized part is subsequently changed by adjusting conditions such as an electric field, a magnetic field, or temperature, and then polymerization is further carried out through irradiation with active energy rays. In particular, exposure to ultraviolet is preferably carried out while an alternating current electric field is applied to the polymerizable-compound-containing liquid crystal composition. The alternating current electric field to be applied preferably has a frequency ranging from 10 Hz to 10 kHz, and more preferably 60 Hz to 10 kHz, and the voltage is determined on the basis of a predetermined pretilt angle in a liquid crystal display device. In other words, the pretilt angle in a liquid crystal display device can be controlled by adjusting voltage to be applied. In MVA-mode liquid crystal display devices, a pretilt angle is preferably controlled to be from 80 degrees to 89.9 degrees in view of alignment stability and contrast.

The temperature in the irradiation procedure is preferably within a temperature range in which the liquid crystal state of the liquid crystal composition of the present invention can be maintained. Polymerization is preferably carried out at a temperature close to room temperature, i.e., typically 15 to 35° C. Preferred examples of a lamp usable for emitting an ultraviolet ray include a metal halide lamp, a high-pressure mercury lamp, and an ultrahigh-pressure mercury lamp. In addition, an ultraviolet ray to be emitted preferably has a wavelength that is in a wavelength region different from the wavelength region of light absorbed by the liquid crystal composition; it is preferred that the ultraviolet ray be appropriately cut off as needed. The intensity of an ultraviolet ray to be emitted is preferably 0.1 mW/cm$^2$ to 100 W/cm$^2$, and more preferably 2 mW/cm$^2$ to 50 W/cm$^2$. The energy of an ultraviolet ray to be emitted can be appropriately adjusted; preferably 10 mJ/cm$^2$ to 500 J/cm$^2$, and more preferably 100 mJ/cm$^2$ to 200 J/cm$^2$. The intensity may be changed in the exposure to ultraviolet. The time of the exposure to ultraviolet is appropriately determined on the basis of the intensity of the ultraviolet ray to be emitted; preferably 10 seconds to 3600 seconds, and more preferably 10 seconds to 600 seconds.

Figure 2:
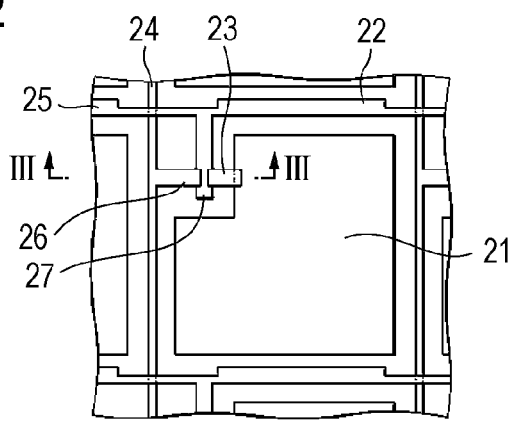
FIG. 2 is an enlarged plan view illustrating a region surrounded by a line II on an electrode layer 3 that is disposed on a substrate in FIG. 1 and that includes thin film transistors.
Figure 3:
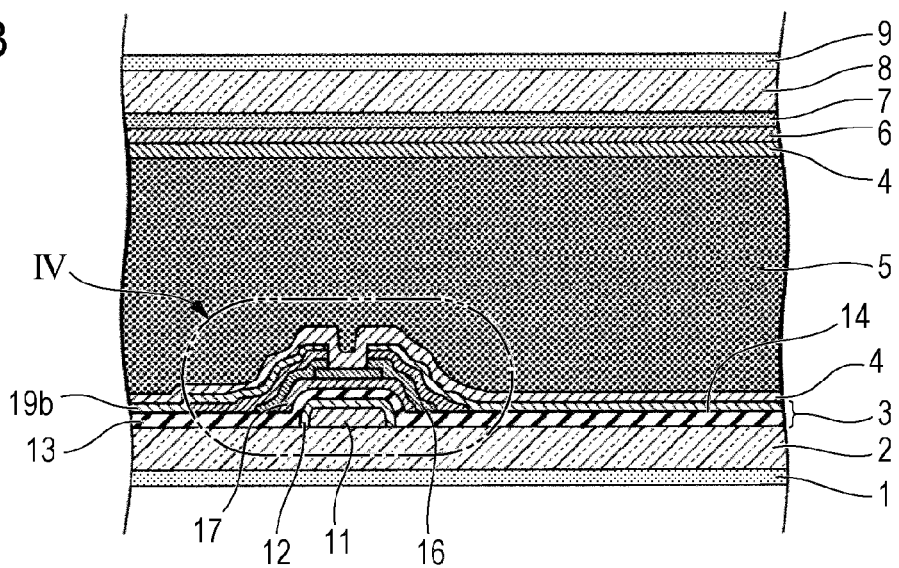
FIG. 3 is a cross-sectional view illustrating the liquid crystal display device in FIG. 1 taken along a line III-III in FIG. 2.
Figure 4:
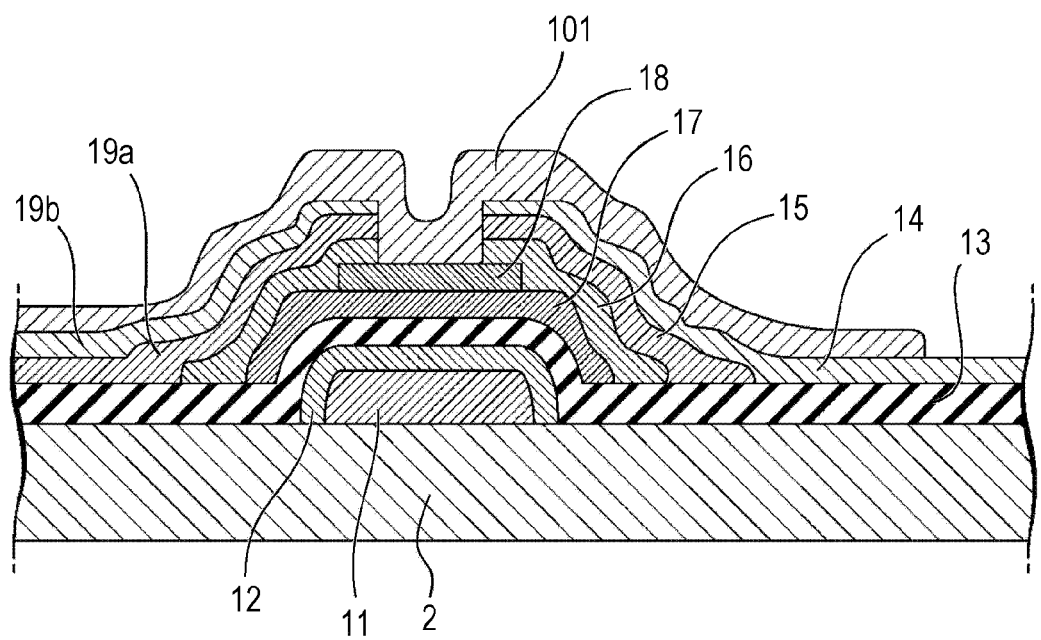
FIG. 4 is an enlarged view illustrating a thin film transistor that is a region surrounded by a line IV in FIG. 3.

The second embodiment of the present invention is a liquid crystal display device in which the liquid crystal composition according to the present invention is used. FIG. 1 illustrates the schematic structure of the liquid crystal display device. In FIG. 1, components are separated from each other for the sake of convenience of illustration. FIG. 2 is an enlarged plan view illustrating a region surrounded by a line II on an electrode layer 3 (also hereinafter referred to as a thin film transistor layer 3) that is disposed on a substrate in FIG. 1 and that includes thin film transistors. FIG. 3 is a cross-sectional view illustrating the liquid crystal display device in FIG. 1 taken along a line III-III in FIG. 2. FIG. 4 is an enlarged view illustrating a thin film transistor that is a region surrounded by a line IV in FIG. 3. The liquid crystal display device according to the present invention will now be described with reference to FIGS. 1 to 4.

A liquid crystal display device 10 according to the present invention includes a first substrate 8 having a transparent electrode (layer) 6 formed of a transparent conductive material (also hereinafter referred to as common electrode 6), a second substrate 2 having a thin film transistor layer 3 including pixel electrodes formed of a transparent conductive material and thin film transistors that are disposed for corresponding pixels so as to control the pixel electrodes, and a liquid crystal composition (alternatively, liquid crystal layer 5) disposed between the first substrate 8 and the second substrate 2. In the liquid crystal display device, the liquid crystal molecules of the liquid crystal composition are aligned so as to be substantially vertical to the substrates 2 to 8 in a state in which voltage is not applied, and the liquid crystal composition used is the above-mentioned liquid crystal composition of the present invention. In addition, the second substrate 2 and the first substrate 8 may be disposed between a pair of polarizing plates 1 and 9 as illustrated in FIGS. 1 and 3. Furthermore, in FIG. 1, a color filter 7 is placed between the first substrate 8 and the common electrode 6. Moreover, a pair of alignment films 4 may be formed on the surfaces of the transparent electrodes (layers) 6 and 14 so as to adjoin the liquid crystal layer 5 according to the present invention and so as to directly contact the liquid crystal composition contained in the liquid crystal layer 5.

In other words, the liquid crystal display device 10 according to the present invention has a layered structure including the second polarizing plate 1, the second substrate 2, the electrode layer 3 including thin film transistors (also referred to as thin film transistor layer), the alignment film 4, the liquid-crystal-composition-containing layer 5, the other alignment film 4, the common electrode 6, the color filter 7, the first substrate 8, and the first polarizing plate 9 in sequence.

With reference to FIG. 2, in the electrode layer 3 disposed on the surface of the second substrate 2 and including thin film transistors, gate wires 25 used for transmitting scanning signals and data wires 24 used for transmitting display signals intersect with each other, the gate wires 25 and the data wires 24 define areas in the form of a matrix, and pixel electrodes 21 are disposed in such areas. In the vicinity of each of the intersections of the gate wires 25 and the data wires 24, a thin film transistor including a source electrode 26, a drain electrode 23, and a gate electrode 27 is disposed as a switching device used for outputting a display signal to the pixel electrode 21 so as to be connected to the pixel electrode 21. Each of the areas defined by the gate wires 25 and data wires 24 has a storage capacitor 22 used for storing a display signal transmitted through a data wire 24.

The present invention is suitably used in a liquid crystal display device including thin film transistors each having an inverted staggered structure illustrated in FIGS. 2 to 4, and the gate wires 25 and the data wires 24 are preferably metal films and especially preferably aluminum wires. The gate wires overlap the data wires with a gate insulating film interposed therebetween.

The color filter 7 preferably has a black matrix (not illustrated) covering the thin film transistors and the storage capacitors 22 to prevent leakage of light.

With reference to FIGS. 3 and 4, for example, a preferred embodiment of the structure of each thin film transistor of the liquid crystal display device according to the present invention includes a gate electrode 11 formed on the surface of the substrate 2, a gate insulating layer 13 covering the gate electrode 11 and formed so as to cover substantially the entire surface of the substrate 2, a semiconductor layer 17 formed on the surface of the gate insulating layer 13 so as to face the gate electrode 11, a protective film 18 formed so as to cover part of the surface of the semiconductor layer 17, a drain electrode 15 covering one end of each of the protective film 18 and semiconductor layer 17 and formed so as to contact the gate insulating layer 13 formed on the surface of the substrate 2, source electrodes 19a and 19b covering the other end of each of the protective film 18 and semiconductor layer 17 and formed so as to contact the gate insulating layer 13 formed on the surface of the substrate 2, a transparent electrode 14 covering the source electrodes 19a and 19b and formed so as to cover substantially the entire surface of the gate insulating layer 13 as in the gate insulating layer 13, and a protective layer 101 (not illustrated in FIG. 3) formed so as to cover part of the transparent electrode 14 and the source electrodes 19a and 19b.

As illustrated in FIGS. 3 and 4, an anode oxide film 12 may be formed on the surface of the gate electrode 11 to, for instance, reduce the step in the gate electrode. Furthermore, in order to reduce the width and height of Schottky barrier, an ohmic contact layer 16 may be formed between the semiconductor layer 17 and the drain electrode 15.

In a process for manufacturing a liquid crystal display device, a liquid crystal material to be injected has a great effect on generation of droplet stains as described above; however, generation of droplet stains is inevitably also affected by the structure of the liquid crystal display device. In particular, the color filter 7 and thin film transistors included in the liquid crystal display device are separated from the liquid crystal composition only by the alignment films 4 and transparent electrodes 6 and 14 each having a small thickness as illustrated in FIG. 3; hence, for example, a combination of the chemical structure of a pigment contained in the color filter or the chemical structure of resin used for the color filter with a specific chemical structure of a liquid crystal compound has an effect on generation of droplet stains.

In particular, in the case where the above-mentioned inverted staggered structure is employed as the structure of the thin film transistors of the liquid crystal display device according to the present invention, the drain electrode 15 is formed so as to cover the gate electrode 11 as illustrated in FIGS. 2 to 4, and thus the drain electrode 15 tends to have a large area. In general, a drain electrode is formed of a metallic material, such as copper, aluminum, chromium, titanium, molybdenum, or tantalum, and subjected to a passivation treatment. However, for instance, the protective film 18 and alignment films 4 are generally thin as illustrated in FIGS. 3 and 4 and therefore less likely to block ionic substances; hence, droplet stains caused by interaction of a metallic material with a liquid crystal composition cannot be prevented.

In the liquid crystal display device in which the liquid crystal composition according to the present invention is used, however, it is expected that problematic generation of droplet stains can be reduced owing to, for instance, a good balance between the components of the liquid crystal display device and the surface free energy or adsorption energy of the liquid crystal composition according to the present invention.

The liquid crystal display device in which the liquid crystal composition of the present invention is used practically enables both quick response and a reduction in defective display and is particularly useful as liquid crystal display devices driven by an active matrix; hence, such a liquid crystal display device can be applied to a VA mode, PSVA mode, PSA mode, IPS mode, and ECB mode.

EXAMPLES

Although the present invention will now be described further in detail with reference to Examples, the present invention is not limited to Examples. In compositions which will be described in Examples and Comparative Examples, the term "%" refers to "mass %".

In Examples, the following properties were measured.

$T_{ni}$: nematic phase-isotropic liquid phase transition temperature (° C.)

Δn: refractive index anisotropy at 25° C.

Δ∈: dielectric anisotropy at 25° C.

η: viscosity at 20° C. (mPa·s)

$\gamma_1$: rotational viscosity at 25° C. (mPa·s)

VHR: voltage holding ratio (%) at a frequency of 60 Hz, an applied voltage of 1 V, and a temperature of 60° C.

Screen Burn-in:

In evaluation of screen burn-in in a liquid crystal display device, a certain fixed pattern was continuously displayed in a display area for 1000 hours, and then an image was displayed evenly on the whole of the screen. Then, the degree of an afterimage of the fixed pattern was visually observed, and result of the observation was evaluated on the basis of the following four criteria.

Excellent: No afterimage observed
Good: Slight afterimage observed, but acceptable
Bad: Afterimage observed, unacceptable
Poor: Afterimage observed, quite inadequate Droplets Stains:

In order to evaluate droplet stains in a liquid crystal display apparatus, white droplet stains which emerged in an entirely-black display mode were visually observed. Result of the observation was evaluated on the basis of the following four criteria.

Excellent: No afterimage observed
Good: Slight afterimage observed, but acceptable
Bad: Afterimage observed, unacceptable
Poor: Afterimage observed, quite inadequate Process Adaptability:

In an ODF process, 50 pL of liquid crystal was dropped 100000 times with a constant volume metering pump, and every 100-times dropping was defined as one cycle such as "0 to 100, 101 to 200, 201 to 300 . . . , and 99901 to 100000". A variation in the amount of dropped liquid crystal between individual cycles was evaluated for process adaptability on the basis of the following four criteria.

Excellent: Significantly small variation (stable manufacturing of liquid crystal display device)
Good: Slight variation, but acceptable
Bad: Unacceptable variation (occurrence of unevenness resulting in reduced yield)
Poor: Quite inadequate with variation (leakage of liquid crystal and generation of vacuum bubble)

Resolution at Low Temperature:

In order to evaluate resolution at low temperature, a liquid crystal composition was prepared, the liquid crystal composition was subsequently weighted to 1 g in a 2-mL sample bottle, and the sample bottle was subjected to a continuous temperature change in a temperature controlled chamber in the following cycle: −20° C. (retained for an hour)→heating (0.1° C./min)→0° C. (retained for an hour)→heating (0.1° C./min)→20° C. (retained for an hour)→cooling (−0.1° C./min)→0° C. (retained for an hour)→cooling (−0.1° C./min)→−20° C. Then, precipitate generated in the liquid crystal composition was visually observed, and result of the observation was evaluated on the basis of the following four criteria.

Excellent: No precipitate observed for at least 600 hours
Good: No precipitate observed for at least 300 hours
Bad: Precipitate observed within 150 hours
Poor: Precipitate observed within 75 hours
In Examples, compounds are abbreviated as follows.

(Side Chain)

n —$C_nH_{2n+1}$ linear alkyl group having n carbon atoms
On —$OC_nH_{2n+1}$ linear alkoxyl group having n carbon atoms
V —C=$CH_2$ vinyl group
Vn —C=C—$C_nH_{2n+1}$ 1-alkene (Ring Structure)

[Chem. 27]

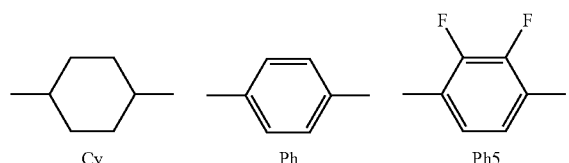

Cy     Ph     Ph5

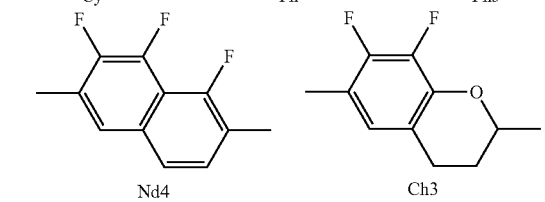

Nd4     Ch3

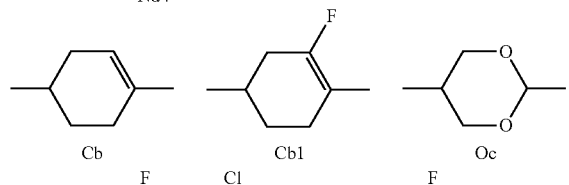

Cb     Cb1     Oc

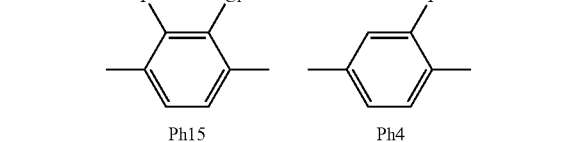

Ph15     Ph4

Example 1

A liquid crystal composition composed of the following components was prepared, and the physical properties thereof were measured. Results of the measurement are shown in the below table.

The liquid crystal composition of Example 1 was used to manufacture a VA-mode liquid crystal display device. In this liquid crystal display device, thin film transistors having an inverted staggered structure were used as active devices. The liquid crystal composition was placed by a dropping technique, and the screen burn-in, droplet stains, process adaptability, and resolution at low temperature were evaluated.

The symbols that are on the left side of amounts are abbreviations of the above-mentioned compounds.

[Chem. 28]

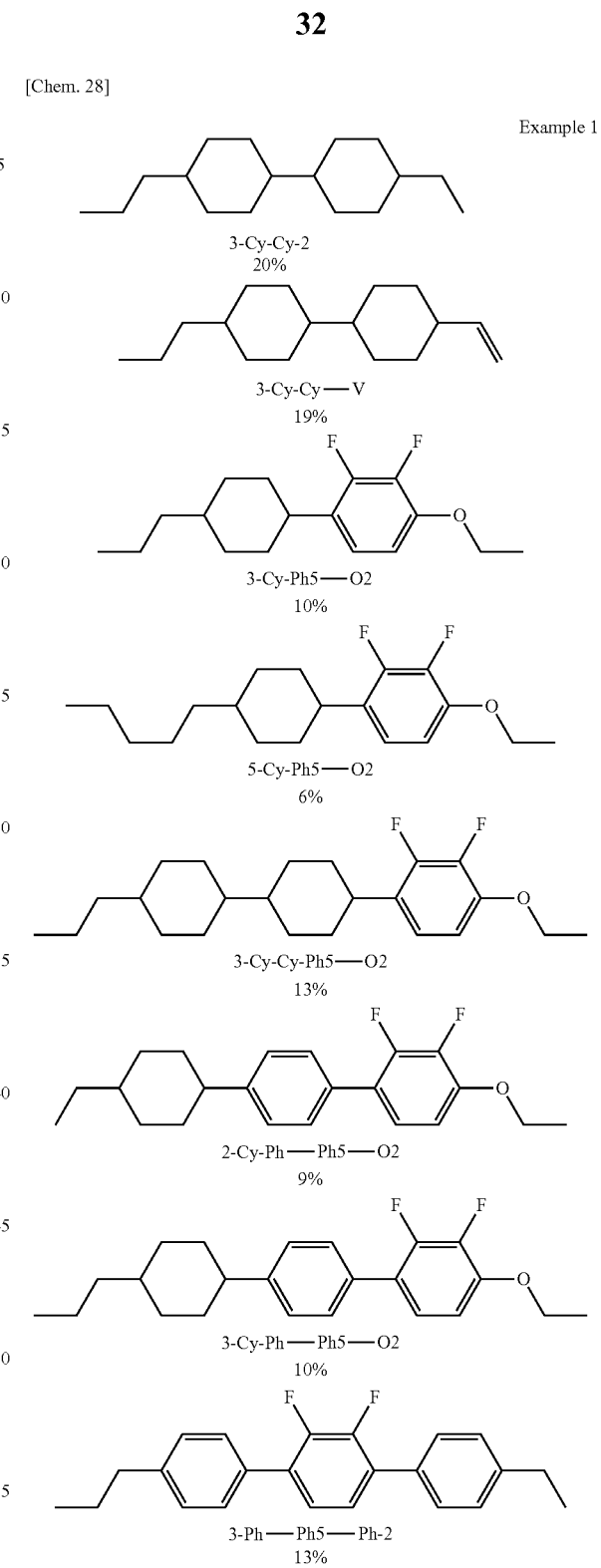

Example 1

TABLE 1

| | |
|---|---|
| $T_{NI}$/° C. | 75.8 |
| Δn | 0.108 |
| $n_o$ | 1.484 |
| Δε | −3.0 |
| $ε_⊥$ | 6.5 |

TABLE 1-continued

| | |
|---|---|
| η/mPa·s | 16.9 |
| $\gamma_1$/mPa·s | 116 |
| $\gamma_1/\Delta n^2$ | 9.9 |
| Initial voltage holding ratio/% | 99.9 |
| Voltage holding ratio after one hour at 150° C./% | 99.3 |
| Evaluation of screen burn-in | Excellent |
| Evaluation of droplet stains | Excellent |
| Evaluation of process adaptability | Excellent |
| Evaluation of resolution at low temperature | Excellent |

In the liquid crystal composition of Example 1, the temperature range of the liquid crystal phase was 75.8° C., which enabled practical use of the liquid crystal composition for TV sets. The liquid crystal composition of Example 1 had a dielectric anisotropy with a large absolute value, low viscosity, and proper Δn. The liquid crystal composition of Example 1 was used to manufacture a VA-mode liquid crystal display device, and the screen burn-in, droplet stains, process adaptability, and resolution at low temperature were evaluated in the manner described above; results of the evaluations were very excellent.

Comparative Example 1

A liquid crystal composition composed of the following components was prepared without use of a compound represented by General Formula (II) so as to exhibit a temperature range of a liquid crystal phase, refractive index anisotropy, and dielectric anisotropy which were equivalent to those of the composition of Example 1. The physical properties thereof were measured. Results of the measurement are shown in the below table.

The liquid crystal composition of Comparative Example 1 was used to manufacture a VA-mode liquid crystal display device as in Example 1, and the screen burn-in, droplet stains, process adaptability, and resolution at low temperature were evaluated. Results of the evaluations are shown in the same table.

The symbols that are on the left side of amounts are abbreviations of the above-mentioned compounds as in Example 1.

[Chem. 29]

Comparative Example 1

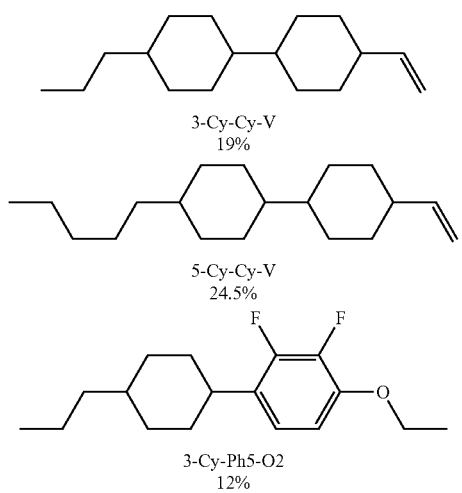

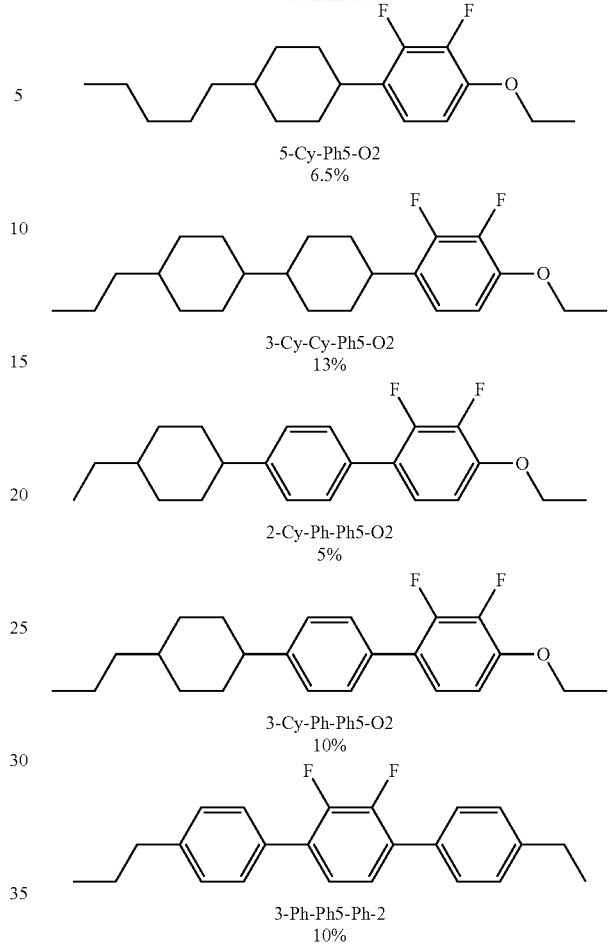

TABLE 2

| | |
|---|---|
| $T_{NI}$/° C. | 75.4 |
| Δn | 0.108 |
| $n_o$ | 1.481 |
| Δε | −3.0 |
| $\epsilon_\perp$ | 6.5 |
| η/mPa·s | 18.3 |
| $\gamma_1$/mPa·s | 121 |
| $\gamma_1/\Delta n^2$ | 10.4 |
| Initial voltage holding ratio/% | 98.8 |
| Voltage holding ratio after one hour at 150° C./% | 97.8 |
| Evaluation of screen burn-in | Poor |
| Evaluation of droplet stains | Poor |
| Evaluation of process adaptability | Bad |
| Evaluation of resolution at low temperature | Bad |

As compared with the liquid crystal composition (Example 1) containing the compound represented by General Formula (II) (20%), the liquid crystal composition (Comparative Example 1) not containing the compound represented by General Formula (II) was equivalent thereto in terms of a temperature range of a liquid crystal phase, refractive index anisotropy, and dielectric anisotropy; however, the viscosity η was large. The $\gamma_1$ of 121 mPa·s in Comparative Example 1 was larger than the $\gamma_1$ of 116 mPa·s in Example 1. Comparing Comparative Example 1 with Example 1 in terms of $\gamma_1/\Delta n^2$ which is a parameter indicating effective response speed in a liquid crystal display device and a display, Comparative Example 1 was more unsatisfactory than Example 1; however, the difference therebetween was not so large. In Comparative Example 1, however, the VHR after the liquid crystal display device was left to stand for an hour at 150° C. was 97.8%, while the initial VHR was 98.8%; this result was significantly worse than the result in Example 1. In the evaluation of process adaptability, the change was unacceptable as compared with Example 1. In the evaluation of resolution at low temperature, precipitate was observed earlier than in Example 1.

Comparative Example 2

A liquid crystal composition (Comparative Example 2) composed of the following components was prepared without use of a compound represented by Formula (I-1) so as to exhibit a temperature range of a liquid crystal phase, refractive index anisotropy, and dielectric anisotropy which were equivalent to those of the composition of Example 1. The physical properties thereof were measured. Results of the measurement are shown in the below table.

The liquid crystal composition of Comparative Example 2 was used to manufacture VA-mode liquid crystal display devices as in Example 1, and the screen burn-in, droplet stains, process adaptability, and resolution at low temperature were evaluated. Results of the evaluations are shown in the same table.

TABLE 3

| Comparative Example 2 | |
|---|---|
| 3-Cy—Cy-2 | 20.0% |
| 5-Cy—Cy—V | 21.0% |
| 3-Cy—Ph5—O2 | 12.0% |
| 5-Cy—Ph5—O2 | 5.0% |
| 3-Cy—Cy—Ph5—O2 | 13.0% |
| 2-Cy—Ph—Ph5—O2 | 9.0% |
| 3-Cy—Ph—Ph5—O2 | 10.0% |
| 3-Ph—Ph5—Ph—2 | 10.0% |
| $T_{NI}$/° C. | 75.9 |
| $\Delta n$ | 0.108 |
| $n_o$ | 1.482 |
| $\Delta \epsilon$ | -3.0 |
| $\epsilon_\perp$ | 6.4 |
| $\eta$/mPa · s | 20.1 |
| $\gamma_1$/mPa · s | 141 |
| $\gamma_1/\Delta n^2$ | 12.1 |

TABLE 3-continued

| Comparative Example 2 | |
|---|---|
| Initial voltage holding ratio/% | 99.0 |
| Voltage holding ratio after one hour at 150° C./% | 98.4 |
| Evaluation of screen burn-in | Bad |
| Evaluation of droplet stains | Poor |
| Evaluation of process adaptability | Bad |
| Evaluation of resolution at low temperature | Poor |

As compared with the liquid crystal composition (Example 1) containing the compound represented by Formula (I-1) (19%), the liquid crystal composition (Comparative Example 2) not containing the compound represented by Formula (I-1) was equivalent thereto in terms of a temperature range of a liquid crystal phase, refractive index anisotropy, and dielectric anisotropy; however, the viscosity $\eta$ was large. The $\gamma_1$ of 141 mPa·s in Comparative Example 2 was at least 20% larger than the $\gamma_1$ of 116 mPa·s in Example 1. Comparing Comparative Example 2 with Example 1 in terms of $\gamma_1/\Delta n^2$ which is a parameter indicating effective response speed in a liquid crystal display device and a display, Comparative Example 2 was more unsatisfactory than Example 1. In Comparative Example 2, the VHR after the liquid crystal display device was left to stand for an hour at 150° C. was 98.4%, while the initial VHR was 99.0%; this result was worse than the result in Example 1. In the evaluation of process adaptability, the change was unacceptable as compared with Example 1. In the evaluation of resolution at low temperature, precipitate was observed earlier than in Example 1.

Examples 2 and 3

Liquid crystal compositions (Examples 2 and 3) composed of the following components were each prepared so as to exhibit a temperature range of a liquid crystal phase, refractive index anisotropy, and dielectric anisotropy which were equivalent to those of the composition of Example 1. The physical properties thereof were measured. Results of the measurement are shown in the below table.

Each of the liquid crystal compositions of Examples 2 and 3 was used to manufacture a VA-mode liquid crystal display device as in Example 1, and the screen burn-in, droplet stains, process adaptability, and resolution at low temperature were evaluated. Results of the evaluations are shown in the same table.

TABLE 4

| Example 2 | | Example 3 | |
|---|---|---|---|
| 3-Cy—Cy-2 | 18.0% | 3-Cy—Cy-2 | 19.0% |
| 3-Cy—Cy-4 | 4.5% | 3-Cy—Cy—O1 | 10.0% |
| 3-Cy—Cy-5 | 6.0% | 3-Cy—Cy—V | 10.0% |
| 3-Cy—Cy—V | 10.0% | 3-Cy—Ph5—O2 | 12.0% |
| 3-Cy—Ph5—O2 | 12.0% | 5-Cy—Ph5—O2 | 2.0% |
| 5-Cy—Ph5—O2 | 7.0% | 3-Cy—Cy—Ph5—O2 | 12.0% |
| 3-Cy—Cy—Ph5—O2 | 11.5% | 4-Cy—Cy—Ph5—O2 | 3.0% |
| 2-Cy—Ph—Ph5—O2 | 8.0% | 2-Cy—Ph—Ph5—O2 | 9.0% |
| 3-Cy—Ph—Ph5—O2 | 10.0% | 3-Cy—Ph—Ph5—O2 | 10.0% |
| 3-Ph—Ph5—Ph-2 | 13.0% | 3-Ph—Ph5—Ph-2 | 13.0% |
| $T_{NI}$/° C. | 75.6 | $T_{NI}$/° C. | 75.4 |
| $\Delta n$ | 0.108 | $\Delta n$ | 0.108 |
| $n_o$ | 1.483 | $n_o$ | 1.484 |
| $\Delta \epsilon$ | -3.0 | $\Delta \epsilon$ | -3.0 |
| $\epsilon_\perp$ | 6.5 | $\epsilon_\perp$ | 6.6 |
| $\eta$/mPa · s | 18.4 | $\eta$/mPa · s | 19.6 |
| $\gamma_1$/mPa · s | 125 | $\gamma_1$/mPa · s | 135 |
| $\gamma_1/\Delta n^2$ | 10.7 | $\gamma_1/\Delta n^2$ | 11.6 |
| Initial voltage holding ratio% | 99.7 | Initial voltage holding ratio/% | 99.6 |
| Voltage holding ratio after one | 99.3 | Voltage holding ratio after one | 99.2 |

TABLE 4-continued

| Example 2 | | Example 3 | |
|---|---|---|---|
| hour at 150° C./% | | hour at 150° C./% | |
| Evaluation of screen burn-in | Excellent | Evaluation of screen burn-in | Good |
| Evaluation of droplet stains | Excellent | Evaluation of droplet stains | Good |
| Evaluation of process adaptability | Good | Evaluation of process adaptability | Good |
| Evaluation of resolution at low temperature | Excellent | Evaluation of resolution at low temperature | Good |

The liquid crystal composition of Example 2 exhibited a temperature range of a liquid crystal phase which enabled practical use of the liquid crystal composition for TV sets and had a dielectric anisotropy with a large absolute value, low viscosity, and proper Δn. The liquid crystal composition of Example 2 was used to manufacture a VA-mode liquid crystal display device, and the screen burn-in, droplet stains, process adaptability, and resolution at low temperature were evaluated in the manner described above; results of the evaluations were excellent.

The liquid crystal composition of Example 3 exhibited a temperature range of a liquid crystal phase which enabled practical use of the liquid crystal composition for TV sets and had a dielectric anisotropy with a large absolute value, low viscosity, and proper Δn. The liquid crystal composition of Example 3 was used to manufacture a VA-mode liquid crystal display device, and the screen burn-in, droplet stains, process adaptability, and resolution at low temperature were evaluated in the manner described above; results of the evaluations were excellent.

Examples 4 and 5

Liquid crystal compositions (Examples 4 and 5) composed of the following components were each prepared so as to exhibit a temperature range of a liquid crystal phase, refractive index anisotropy, and dielectric anisotropy which were equivalent to those of the composition of Example 1. The physical properties thereof were measured. Results of the measurement are shown in the below table.

Each of the liquid crystal compositions of Examples 4 and 5 was used to manufacture a VA-mode liquid crystal display device as in Example 1, and the screen burn-in, droplet stains, process adaptability, and resolution at low temperature were evaluated. Results of the evaluations are shown in the same table.

TABLE 5

| Example 4 | | Example 5 | |
|---|---|---|---|
| 3-Cy—Cy-2 | 20.0% | 3-Cy—Cy-2 | 13.0% |
| 3-Cy—Cy—V | 10.0% | 3-Cy—Cy-4 | 3.0% |
| 3-Cy—Cy—V1 | 10.0% | 3-Cy—Cy-5 | 4.5% |
| 3-Cy—Ph5—O2 | 12.0% | 3-Cy—Cy—V | 10.0% |
| 5-Cy—Ph5—O2 | 6.0% | 3-Cy—Cy—V1 | 10.0% |
| 3-Cy—Cy—Ph5—O2 | 13.0% | 3-Cy—Ph5—O2 | 12.0% |
| 2-Cy—Ph—Ph5—O2 | 6.0% | 5-Cy—Ph5—O2 | 8.0% |
| 3-Cy—Ph—Ph5—O2 | 10.0% | 3-Cy—Cy—Ph5—O2 | 10.5% |
| 3-Ph—Ph5—Ph-2 | 13.0% | 2-Cy—Ph—Ph5—O2 | 6.0% |
| $T_{NI}$/° C. | 75.6 | 3-Cy—Ph—Ph5—O2 | 10.0% |
| Δn | 0.108 | 3-Ph—Ph5—Ph-2 | 13.0% |
| $n_o$ | 1.483 | $T_{NI}$/° C. | 75.8 |
| Δε | −3.0 | Δn | 0.108 |
| $ε_⊥$ | 6.5 | $n_o$ | 1.482 |
| η/mPa · s | 16.7 | Δε | −3.0 |
| $γ_1$/mPa · s | 115 | $ε_⊥$ | 6.5 |
| $γ_1/Δn^2$ | 9.9 | η/mPa · s | 17.3 |
| Initial voltage holding ratio/% | 99.5 | $γ_1$/mPa · s | 118 |
| Voltage holding ratio after one hour at 150° C./% | 99.1 | $γ_1/Δn^2$ | 10.1 |
| Evaluation of screen burn-in | Excellent | Initial voltage holding ratio/% | 99.5 |
| Evaluation of droplet stains | Excellent | Voltage holding ratio after one hour at 150° C./% | 99.2 |
| Evaluation of process adaptability | Excellent | Evaluation of screen burn-in | Excellent |
| Evaluation of resolution at low temperature | Excellent | Evaluation of droplet stains | Excellent |
| | | Evaluation of process adaptability | Excellent |
| | | Evaluation of resolution at low temperature | Good |

The liquid crystal composition of Example 4 exhibited a temperature range of a liquid crystal phase which enabled practical use of the liquid crystal composition for TV sets and had a dielectric anisotropy with a large absolute value, low viscosity, and proper Δn. The liquid crystal composition of Example 4 was used to manufacture a VA-mode liquid crystal display device, and the screen burn-in, droplet stains, process adaptability, and resolution at low temperature were evaluated in the manner described above; results of the evaluations were excellent.

The liquid crystal composition of Example 5 exhibited a temperature range of a liquid crystal phase which enabled practical use of the liquid crystal composition for TV sets and had a dielectric anisotropy with a large absolute value, low viscosity, and proper Δn. The liquid crystal composition of Example 5 was used to manufacture a VA-mode liquid crystal display device, and the screen burn-in, droplet stains, process adaptability, and resolution at low temperature were evaluated in the manner described above; results of the evaluations were excellent.

Examples 6 and 7

Liquid crystal compositions (Examples 6 and 7) composed of the following components were each prepared so as to exhibit a temperature range of a liquid crystal phase, refractive index anisotropy, and dielectric anisotropy which were equivalent to those of the composition of Example 1. The physical properties thereof were measured. Results of the measurement are shown in the below table.

Each of the liquid crystal compositions of Examples 6 and 7 was used to manufacture a VA-mode liquid crystal display device as in Example 1, and the screen burn-in, droplet stains, process adaptability, and resolution at low temperature were evaluated. Results of the evaluations are shown in the same table.

temperature range of a liquid crystal phase, refractive index anisotropy, and dielectric anisotropy which were equivalent to those of the composition of Example 1. The physical properties thereof were measured. Results of the measurement are shown in the below table.

The liquid crystal composition of Example 8 was used to manufacture a VA-mode liquid crystal display device as in Example 1, and the screen burn-in, droplet stains, process adaptability, and resolution at low temperature were evaluated. Results of the evaluations are shown in the same table.

TABLE 6

| Example 6 | | Example 7 | |
| --- | --- | --- | --- |
| 3-Cy—Cy-2 | 13.0% | 3-Cy—Cy-2 | 12.0% |
| 3-Cy—Cy—O1 | 8.0% | 3-Cy—Cy-4 | 3.0% |
| 3-Cy—Cy—V | 10.0% | 3-Cy—Cy-5 | 4.0% |
| 3-Cy—Cy—V1 | 10.0% | 3-Cy—Cy—O1 | 5.0% |
| 3-Cy—Ph5—O2 | 12.0% | 3-Cy—Cy—V | 8.0% |
| 5-Cy—Ph5—O2 | 4.5% | 3-Cy—Cy—V1 | 8.0% |
| 3-Cy—Cy—Ph5—O2 | 12.0% | 3-Cy—Ph5—O2 | 12.0% |
| 4-Cy—Cy—Ph5—O2 | 1.5% | 5-Cy—Ph5—O2 | 7.0% |
| 2-Cy—Ph—Ph5—O2 | 6.0% | 3-Cy—Cy—Ph5—O2 | 12.0% |
| 3-Cy—Ph—Ph5—O2 | 10.0% | 2-Cy—Ph—Ph5—O2 | 6.0% |
| 3-Ph—Ph5—Ph-2 | 13.0% | 3-Cy—Ph—Ph5 —O2 | 10.0% |
| $T_{NI}/°$ C. | 75.2 | 3-Ph—Ph5—Ph-2 | 13.0% |
| $\Delta n$ | 0.108 | $T_{NI}/°$ C. | 75.2 |
| $n_o$ | 1.483 | $\Delta n$ | 0.108 |
| $\Delta \epsilon$ | −3.0 | $n_o$ | 1.483 |
| $\epsilon_\perp$ | 6.5 | $\Delta \epsilon$ | −3.0 |
| $\eta$/mPa · s | 18.0 | $\epsilon_\perp$ | 6.5 |
| $\gamma_1$/mPa · s | 124 | $\eta$/mPa · s | 18.5 |
| $\gamma_1/\Delta n^2$ | 10.6 | $\gamma_1$/mPa · s | 126 |
| Initial voltage holding ratio/% | 99.4 | $\gamma_1/\Delta n^2$ | 10.8 |
| Voltage holding ratio after one hour at 150° C./% | 99.0 | Initial voltage holding ratio/% | 99.6 |
| Evaluation of screen burn-in | Good | Voltage holding ratio after one hour at 150° C./% | 99.1 |
| Evaluation of droplet stains | Good | Evaluation of screen burn-in | Good |
| Evaluation of process adaptability | Good | Evaluation of droplet stains | Excellent |
| Evaluation of resolution at low temperature | Good | Evaluation of process adaptability | Good |
| | | Evaluation of resolution at low temperature | Excellent |

The liquid crystal composition of Example 6 exhibited a temperature range of a liquid crystal phase which enabled practical use of the liquid crystal composition for TV sets and had a dielectric anisotropy with a large absolute value, low viscosity, and proper Δn. The liquid crystal composition of Example 6 was used to manufacture a VA-mode liquid crystal display device, and the screen burn-in, droplet stains, process adaptability, and resolution at low temperature were evaluated in the manner described above; results of the evaluations were excellent.

The liquid crystal composition of Example 7 exhibited a temperature range of a liquid crystal phase which enabled practical use of the liquid crystal composition for TV sets and had a dielectric anisotropy with a large absolute value, low viscosity, and proper Δn. The liquid crystal composition of Example 7 was used to manufacture a VA-mode liquid crystal display device, and the screen burn-in, droplet stains, process adaptability, and resolution at low temperature were evaluated in the manner described above; results of the evaluations were excellent.

Example 8

A liquid crystal composition (Example 8) composed of the following components was prepared so as to exhibit a

TABLE 7

| Example 8 | |
| --- | --- |
| 3-Cy—Cy-2 | 20.0% |
| 3-Cy—Cy—V | 21.0% |
| 3-Cy—Cy—Ph-1 | 3.0% |
| 3-Cy—Ph5—O2 | 5.5% |
| 3-Ph—Ph5—O2 | 10.0% |
| 3-Cy—Cy—Ph5—O2 | 13.0% |
| 4-Cy—Cy—Ph5—O2 | 2.5% |
| 2-Cy—Ph—Ph5—O2 | 5.0% |
| 3-Cy—Ph—Ph5—O2 | 10.0% |
| 3-Ph—Ph5—Ph-2 | 10.0% |
| $T_{NI}/°$ C. | 75.5 |
| $\Delta n$ | 0.108 |
| $n_o$ | 1.486 |
| $\Delta \epsilon$ | −3.0 |
| $\epsilon_\perp$ | 6.4 |
| $\eta$/mPa · s | 14.7 |
| $\gamma_1$/mPa · s | 102 |
| $\gamma_1/\Delta n^2$ | 8.7 |
| Initial voltage holding ratio/% | 99.9 |
| Voltage holding ratio after one hour at 150° C./% | 99.2 |
| Evaluation of screen burn-in | Excellent |
| Evaluation of droplet stains | Excellent |
| Evaluation of process adaptability | Excellent |
| Evaluation of resolution at low temperature | Excellent |

The liquid crystal composition of Example 8 exhibited a temperature range of a liquid crystal phase which enabled practical use of the liquid crystal composition for TV sets and had a dielectric anisotropy with a large absolute value, low viscosity, and proper Δn. The liquid crystal composition of Example 8 was used to manufacture a VA-mode liquid crystal display device, and the screen burn-in, droplet stains, process adaptability, and resolution at low temperature were evaluated in the manner described above; results of the evaluations were excellent.

Comparative Examples 3 and 4

A liquid crystal composition (Comparative Example 3) was prepared without use of a compound represented by General Formula (II) so as to exhibit a temperature range of a liquid crystal phase, refractive index anisotropy, and dielectric anisotropy which were equivalent to those of the composition of Example 8, and a liquid crystal composition (Comparative Example 4) was prepared without use of a compound represented by Formula (I-1) so as to exhibit a temperature range of a liquid crystal phase, refractive index anisotropy, and dielectric anisotropy which were equivalent to those of the composition of Example 8. The physical properties thereof were measured. Results of the measurement are shown in the below table.

Each of the liquid crystal compositions of Comparative Examples 3 and 4 was used to manufacture a VA-mode liquid crystal display device as in Example 1, and the screen burn-in, droplet stains, process adaptability, and resolution at low temperature were evaluated. Results of the evaluations are shown in the same table.

response speed in a liquid crystal display device and a display, Comparative Example 3 was more unsatisfactory than Example 8; however, the difference therebetween was not so large. In Comparative Example 3, however, the VHR after the liquid crystal display device was left to stand for an hour at 150° C. was 98.0%, while the initial VHR was 98.9%; this result was significantly worse than the result in Example 8. In the evaluation of process adaptability, the change was unacceptable as compared with Example 8. In the evaluation of resolution at low temperature, precipitate was observed earlier than in Example 8.

As compared with the liquid crystal composition (Example 8) containing the compound represented by Formula (I-1) (21%), the liquid crystal composition (Comparative Example 4) not containing the compound represented by General Formula (I-1) was equivalent thereto in terms of a temperature range of a liquid crystal phase, refractive index anisotropy, and dielectric anisotropy; however, the viscosity η was large. The $\gamma_1$ of 129 mPa·s in Comparative Example 4 was at least 25% larger than the $\gamma_1$ of 102 mPa·s in Example 8. Comparing Comparative Example 4 with Example 8 in terms of $\gamma_1/\Delta n^2$ which is a parameter indicating effective response speed in a liquid crystal display device and a display, Comparative Example 4 was more unsatisfactory than Example 8. In Comparative Example 4, however, the VHR after the liquid crystal display device was left to stand for an hour at 150° C. was 98.5%, while the initial VHR was 99.2%; this result was significantly worse than the result in Example 8. In the evaluation of process adaptabil-

TABLE 8

| Comparative Example 3 | | Comparative Example 4 | |
|---|---|---|---|
| 3-Cy—Cy—V | 21.0% | 3-Cy—Cy-2 | 20.0% |
| 5-Cy—Cy—V | 25.0% | 5-Cy—Cy—V | 23.0% |
| 3-Cy—Cy—Ph-1 | 3.0% | 3-Cy—Cy—Ph-1 | 3.0% |
| 3-Cy—Ph5—O2 | 7.0% | 3-Cy—Ph5—O2 | 6.5% |
| 3-Ph—Ph5—O2 | 10.0% | 3-Ph—Ph5—O2 | 10.0% |
| 3-Cy—Cy—Ph5—O2 | 12.0% | 3-Cy—Cy—Ph5—O2 | 12.0% |
| 4-Cy—Cy—Ph5—O2 | 3.0% | 4-Cy—Cy—Ph5—O2 | 4.5% |
| 2-Cy—Ph— Ph5—O2 | 5.0% | 2-Cy—Ph—Ph5—O2 | 5.0% |
| 3-Cy—Ph—Ph5—O2 | 7.0% | 3-Cy—Ph— Ph5—O2 | 8.0% |
| 3-Ph—Ph5—Ph—2 | 7.0% | 3-Ph—Ph5—Ph-2 | 8.0% |
| $T_{NI}$/° C. | 75.3 | $T_{NI}$/° C. | 75.7 |
| Δn | 0.108 | Δn | 0.108 |
| $n_o$ | 1.483 | $n_o$ | 1.483 |
| Δε | −3.0 | Δε | −3.0 |
| $\epsilon_\perp$ | 6.3 | $\epsilon_\perp$ | 6.2 |
| η/mPa · s | 16.1 | η/mPa · s | 17.9 |
| $\gamma_1$/mPa · s | 108 | $\gamma_1$/mPa · s | 129 |
| $\gamma_1/\Delta n^2$ | 9.3 | $\gamma_1/\Delta n^2$ | 11.1 |
| Initial voltage holding ratio/% | 98.9 | Initial voltage holding ratio/% | 99.2 |
| Voltage holding ratio after one hour at 150° C./% | 98.0 | Voltage holding ratio after one hour at 150° C./% | 98.5 |
| Evaluation of screen burn-in | Poor | Evaluation of screen burn-in | Poor |
| Evaluation of droplet stains | Bad | Evaluation of droplet stains | Poor |
| Evaluation of process adaptability | Excellent | Evaluation of process adaptability | Good |
| Evaluation of resolution at low temperature | Poor | Evaluation of resolution at low temperature | Poor |

As compared with the liquid crystal composition (Example 8) containing the compound represented by Formula (II) (20%), the liquid crystal composition (Comparative Example 3) not containing the compound represented by General Formula (II) was equivalent thereto in terms of a temperature range of a liquid crystal phase, refractive index anisotropy, and dielectric anisotropy; however, the viscosity η was large. The $\gamma_1$ of 108 mPa·s in Comparative Example 3 was larger than the $\gamma_1$ of 102 mPa·s in Example 1. Comparing Comparative Example 3 with Example 8 in terms of $\gamma_1/\Delta n^2$ which is a parameter indicating effective ity, the change was unacceptable as compared with Example 8. In the evaluation of resolution at low temperature, precipitate was observed earlier than in Example 8.

Examples 9 and 10

Liquid crystal compositions (Examples 9 and 10) composed of the following components were each prepared so as to exhibit a temperature range of a liquid crystal phase, refractive index anisotropy, and dielectric anisotropy which were equivalent to those of the composition of Example 8.

The physical properties thereof were measured. Results of the measurement are shown in the below table.

Each of the liquid crystal compositions of Examples 9 and 10 was used to manufacture a VA-mode liquid crystal display device as in Example 8, and the screen burn-in, droplet stains, process adaptability, and resolution at low temperature were evaluated. Results of the evaluations are shown in the same table.

practical use of the liquid crystal composition for TV sets and had a dielectric anisotropy with a large absolute value, low viscosity, and proper Δn. The liquid crystal composition of Example 10 was used to manufacture a VA-mode liquid crystal display device, and the screen burn-in, droplet stains, process adaptability, and resolution at low temperature were evaluated in the manner described above; results of the evaluations were excellent.

TABLE 9

| Example 9 | | Example 10 | |
|---|---|---|---|
| 3-Cy—Cy-2 | 18.0% | 3-Cy—Cy-2 | 20.0% |
| 3-Cy—Cy-4 | 5.0% | 3-Cy—Cy—O1 | 10.0% |
| 3-Cy—Cy-5 | 8.0% | 3-Cy—Cy—V | 10.0% |
| 3-Cy—Cy—V | 10.0% | 3-Cy—Cy—Ph-1 | 4.0% |
| 3-Cy—Cy—Ph-1 | 3.0% | 3-Cy—Ph5—O2 | 4.0% |
| 3-Cy—Ph5—O2 | 8.5% | 3-Ph—Ph5—O2 | 10.0% |
| 3-Ph—Ph5—O2 | 10.0% | 3-Cy—Cy—Ph5—O2 | 13.0% |
| 3-Cy—Cy—Ph5—O2 | 12.5% | 4-Cy—Cy—Ph5—O2 | 4.0% |
| 2-Cy—Ph—Ph5—O2 | 5.0% | 2-Cy—Ph—Ph5—O2 | 5.0% |
| 3-Cy—Ph—Ph5—O2 | 10.0% | 3-Cy—Ph—Ph5—O2 | 10.0% |
| 3-Ph—Ph5—Ph-2 | 10.0% | 3-Ph—Ph5—Ph-2 | 10.0% |
| $T_{NI}/°$ C. | 75.0 | $T_{NI}/°$ C. | 75.7 |
| Δn | 0.108 | Δn | 0.108 |
| $n_o$ | 1.485 | $n_o$ | 1.486 |
| Δε | −3.0 | Δε | −3.0 |
| $\epsilon_\perp$ | 6.3 | $\epsilon_\perp$ | 6.4 |
| η/mPa · s | 16.1 | η/mPa · s | 17.4 |
| $\gamma_1$/mPa · s | 111 | $\gamma_1$/mPa · s | 124 |
| $\gamma_1/\Delta n^2$ | 9.5 | $\gamma_1/\Delta n^2$ | 10.6 |
| Initial voltage holding ratio/% | 99.6 | Initial voltage holding ratio/% | 99.7 |
| Voltage holding ratio after one hour at 150° C./% | 99.1 | Voltage holding ratio after one hour at 150° C./% | 99.4 |
| Evaluation of screen burn-in | Excellent | Evaluation of screen burn-in | Excellent |
| Evaluation of droplet stains | Excellent | Evaluation of droplet stains | Good |
| Evaluation of process adaptability | Excellent | Evaluation of process adaptability | Good |
| Evaluation of resolution at low temperature | Good | Evaluation of resolution at low temperature | Excellent |

The liquid crystal composition of Example 9 exhibited a temperature range of a liquid crystal phase which enabled practical use of the liquid crystal composition for TV sets and had a dielectric anisotropy with a large absolute value, low viscosity, and proper Δn. The liquid crystal composition of Example 9 was used to manufacture a VA-mode liquid crystal display device, and the screen burn-in, droplet stains, process adaptability, and resolution at low temperature were evaluated in the manner described above; results of the evaluations were excellent.

The liquid crystal composition of Example 10 exhibited a temperature range of a liquid crystal phase which enabled Examples 11 and 12

Liquid crystal compositions (Examples 11 and 12) composed of the following components were each prepared so as to exhibit a temperature range of a liquid crystal phase, refractive index anisotropy, and dielectric anisotropy which were equivalent to those of the composition of Example 8. The physical properties thereof were measured. Results of the measurement are shown in the below table.

Each of the liquid crystal compositions of Examples 11 and 12 was used to manufacture a VA-mode liquid crystal display device as in Example 8, and the screen burn-in, droplet stains, process adaptability, and resolution at low temperature were evaluated. Results of the evaluations are shown in the same table.

TABLE 10

| Example 11 | | Example 12 | |
|---|---|---|---|
| 3-Cy—Cy-2 | 22.0% | 3-Cy—Cy-2 | 13.0% |
| 3-Cy—Cy—V | 10.0% | 3-Cy—Cy-4 | 4.0% |
| 3-Cy—Cy—V1 | 10.0% | 3-Cy—Cy-5 | 8.0% |
| 3-Cy—Cy—Ph-1 | 4.0% | 3-Cy—Cy—V | 10.0% |
| 3-Cy—Ph5—O2 | 7.0% | 3-Cy—Cy—V1 | 10.0% |
| 3-Ph—Ph5—O2 | 10.0% | 3-Cy—Ph5—O2 | 8.0% |
| 3-Cy—Cy—Ph5—O2 | 13.0% | 3-Ph—Ph5—O2 | 10.0% |
| 2-Cy—Ph—Ph5—O2 | 5.0% | 3-Cy—Cy—Ph5—O2 | 13.0% |
| 3-Cy—Ph—Ph5—O2 | 10.0% | 2-Cy—Ph—Ph5—O2 | 5.0% |
| 3-Ph—Ph5—Ph-2 | 9.0% | 3-Cy—Ph—Ph5—O2 | 9.0% |
| $T_{NI}/°$ C. | 75.5 | 3-Ph—Ph5—Ph-2 | 10.0% |
| Δn | 0.108 | $T_{NI}/°$ C. | 75.2 |
| $n_o$ | 1.485 | Δn | 0.108 |
| Δε | −3.0 | $n_o$ | 1.483 |
| $\epsilon_\perp$ | 6.2 | Δε | −3.0 |

TABLE 10-continued

| | Example 11 | | Example 12 | |
|---|---|---|---|---|
| η/mPa · s | 14.5 | $\epsilon_\perp$ | | 6.3 |
| $\gamma_1$/mPa · s | 102 | η/mPa · s | | 15.4 |
| $\gamma_1$/Δn² | 8.7 | $\gamma_1$/mPa · s | | 107 |
| Initial voltage holding ratio/% | 99.3 | $\gamma_1$/Δn² | | 9.2 |
| Voltage holding ratio after one hour at 150° C./% | 99.0 | Initial voltage holding ratio/% Voltage holding ratio after one hour at 150° C./% | | 99.4 99.1 |
| Evaluation of screen burn-in | Excellent | | | |
| Evaluation of droplet stains | Excellent | Evaluation of screen burn-in | | Good |
| Evaluation of process adaptability | Excellent | Evaluation of droplet stains | | Excellent |
| Evaluation of resolution at low temperature | Excellent | Evaluation of process adaptability | | Excellent |
| | | Evaluation of resolution at low temperature | | Good |

The liquid crystal composition of Example 11 exhibited a temperature range of a liquid crystal phase which enabled practical use of the liquid crystal composition for TV sets and had a dielectric anisotropy with a large absolute value, low viscosity, and proper Δn. The liquid crystal composition of Example 11 was used to manufacture a VA-mode liquid crystal display device, and the screen burn-in, droplet stains, process adaptability, and resolution at low temperature were evaluated in the manner described above; results of the evaluations were excellent.

The liquid crystal composition of Example 12 exhibited a temperature range of a liquid crystal phase which enabled practical use of the liquid crystal composition for TV sets

Examples 13 and 14

Liquid crystal compositions (Examples 13 and 14) composed of the following components were each prepared so as to exhibit a temperature range of a liquid crystal phase, refractive index anisotropy, and dielectric anisotropy which were equivalent to those of the composition of Example 8. The physical properties thereof were measured. Results of the measurement are shown in the below table.

Each of the liquid crystal compositions of Examples 13 and 14 was used to manufacture a VA-mode liquid crystal display device as in Example 8, and the screen burn-in, droplet stains, process adaptability, and resolution at low temperature were evaluated. Results of the evaluations are shown in the same table.

TABLE 11

| | Example 13 | | Example 14 | |
|---|---|---|---|---|
| 3-Cy—Cy-2 | 15.0% | 3-Cy—Cy-2 | | 15.0% |
| 3-Cy—Cy—O1 | 10.0% | 3-Cy—Cy-4 | | 3.0% |
| 3-Cy—Cy—V | 10.0% | 3-Cy—Cy-5 | | 4.5% |
| 3-Cy—Cy—V1 | 10.0% | 3-Cy—Cy—O1 | | 6.0% |
| 3-Cy—Ph5—O2 | 3.5% | 3-Cy—Cy—V | | 8.0% |
| 3-Ph—Ph5—O2 | 10.0% | 3-Cy—Cy—V1 | | 8.0% |
| 3-Cy—Cy—Ph5—O2 | 12.0% | 3-Cy—Ph5—O2 | | 5.5% |
| 4-Cy—Cy—Ph5—O2 | 4.5% | 3-Ph—Ph5—O2 | | 10.0% |
| 2-Cy—Ph—Ph5—O2 | 5.0% | 3-Cy—Cy—Ph5—O2 | | 12.0% |
| 3-Cy—Ph—Ph5—O2 | 10.0% | 4-Cy—Cy—Ph5—O2 | | 3.0% |
| 3-Ph—Ph5—Ph-2 | 10.0% | 2-Cy—Ph—Ph5—O2 | | 5.0% |
| $T_{NI}$/° C. | 75.2 | 3-Cy—Ph—Ph5—O2 | | 10.0% |
| Δn | 0.108 | 3-Ph—Ph5—Ph-2 | | 10.0% |
| $n_o$ | 1.485 | $T_{NI}$/° C. | | 75.6 |
| Δε | −3.0 | Δn | | 0.108 |
| $\epsilon_\perp$ | 6.4 | $n_o$ | | 1.484 |
| η/mPa · s | 16.5 | Δε | | −3.0 |
| $\gamma_1$/mPa · s | 119 | $\epsilon_\perp$ | | 6.4 |
| $\gamma_1$/Δn² | 10.2 | η/mPa · s | | 16.6 |
| Initial voltage holding ratio/% | 99.4 | $\gamma_1$/mPa · s | | 118 |
| Voltage holding ratio after one hour at 150° C./% | 99.2 | $\gamma_1$/Δn² Initial voltage holding ratio/% Voltage holding ratio after one hour at 150° C./% | | 10.1 99.5 99.0 |
| Evaluation of screen burn-in | Excellent | | | |
| Evaluation of droplet stains | Good | Evaluation of screen burn-in | | Excellent |
| Evaluation of process adaptability | Good | Evaluation of droplet stains | | Excellent |
| Evaluation of resolution at low temperature | Excellent | Evaluation of process adaptability | | Excellent |
| | | Evaluation of resolution at low temperature | | Good | and had a dielectric anisotropy with a large absolute value, low viscosity, and proper Δn. The liquid crystal composition of Example 12 was used to manufacture a VA-mode liquid crystal display device, and the screen burn-in, droplet stains, process adaptability, and resolution at low temperature were evaluated in the manner described above; results of the evaluations were excellent.

The liquid crystal composition of Example 13 exhibited a temperature range of a liquid crystal phase which enabled practical use of the liquid crystal composition for TV sets and had a dielectric anisotropy with a large absolute value, low viscosity, and proper Δn. The liquid crystal composition of Example 13 was used to manufacture a VA-mode liquid crystal display device, and the screen burn-in, droplet stains, process adaptability, and resolution at low temperature were evaluated in the manner described above; results of the evaluations were excellent.

The liquid crystal composition of Example 14 exhibited a temperature range of a liquid crystal phase which enabled practical use of the liquid crystal composition for TV sets and had a dielectric anisotropy with a large absolute value, low viscosity, and proper Δn. The liquid crystal composition of Example 14 was used to manufacture a VA-mode liquid crystal display device, and the screen burn-in, droplet stains, process adaptability, and resolution at low temperature were evaluated in the manner described above; results of the evaluations were excellent.

REFERENCE SIGNS LIST

1 Second polarizing plate
2 Second substrate
3 Thin film transistor layer, electrode layer including thin film transistors
4 Alignment film
5 Liquid crystal layer
6 Pixel electrode (common electrode)
7 Color filter
8 First substrate
9 First polarizing plate
10 Liquid crystal display device
11 Gate electrode
12 Anode oxide film
13 Gate insulating layer
14 Transparent electrode (layer)
15 Drain electrode
16 Ohmic contact layer
17 Semiconductor layer
18 Protective film
19a, 19b Source electrode
21 Pixel electrode
22 Storage capacitor
23 Drain electrode
24 Data wire
25 Gate wire
26 Source electrode
27 Gate electrode
101 Protective layer

The invention claimed is:
1. A liquid crystal composition having a negative dielectric anisotropy, the liquid crystal composition comprising:
a compound represented by Formula (I-1);
at least one compound represented by General Formula (II);
a compound represented by Formula (IVb-1);
a compound represented by Formula (IIIb-1), and
a compound represented by Formula (V-5-1),

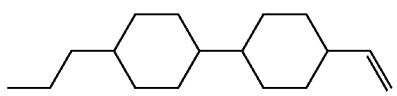
(I-1)

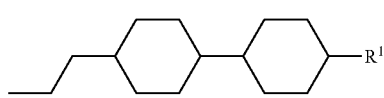
(II)

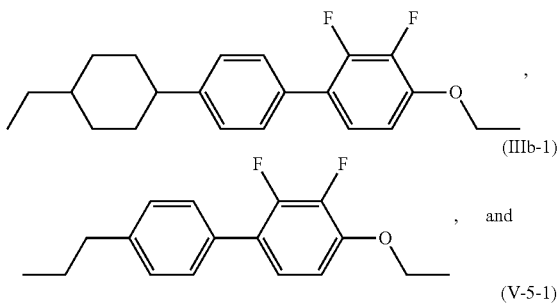

wherein in the General Formula (II), $R^1$ represents an alkyl group having 2 to 5 carbon atoms or an alkoxy group having 1 to 4 carbon atoms.

2. The liquid crystal composition according to claim 1, wherein $R^1$ in General Formula (II) is an ethyl group.

3. The liquid crystal composition according to claim 1, further comprising one or two compounds selected from the group consisting of compounds represented by Formulae (I-2) and (I-3)

[Chem. 2]

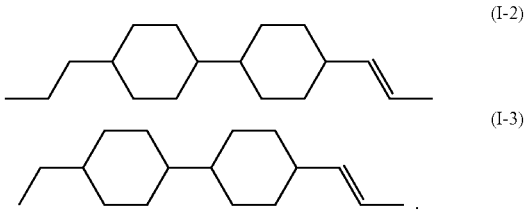

4. The liquid crystal composition according to claim 1, wherein the amount of the compound represented by Formula (I-1) is in the range of 10 to 23 mass %.

5. The liquid crystal composition according to claim 1, further comprising a compound represented by General Formula (III)

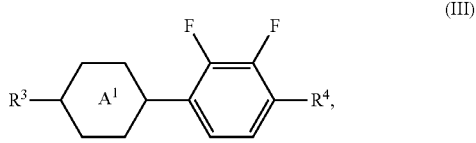

where $R^3$ and $R^4$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; at least one hydrogen atom of the alkyl group, alkenyl group, alkoxy group, and/or alkenyloxy group is optionally substituted with a fluorine atom; the methylene group of the alkyl group, alkenyl group, alkoxy group, and/or alkenyloxy group is optionally substituted with an oxygen atom provided that the oxygen atom is not bonded to another oxygen atom in series or substituted with a carbonyl group provided that the carbonyl group is not bonded to another carbonyl group in series; A' represents a 1,4-cyclohexylene group, or a tetrahydropyran-2,5-diyl group.

6. The liquid crystal composition according to claim 1, further comprising a compound represented by General Formula (IV)

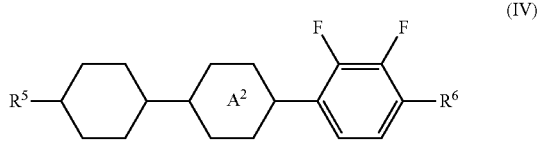

where $R^5$ and $R^6$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; at least one hydrogen atom of the alkyl group, alkenyl group, alkoxy group, and/or alkenyloxy group is optionally substituted with a fluorine atom; the methylene group of the alkyl group, alkenyl group, alkoxy group, and/or alkenyloxy group is optionally substituted with an oxygen atom provided that the oxygen atom is not bonded to another oxygen atom in series or substituted with a carbonyl group provided that the carbonyl group is not bonded to another carbonyl group in series; $A^2$ represents a 1,4-cyclohexylene group, a 1,4-phenylene group, or a tetrahydropyran-2,5-diyl group; in the case where $A^2$ represents a 1,4-phenylene group, at least one hydrogen atom of the 1,4-phenylene group is optionally substituted with a fluorine atom; and the compound represented by General Formula (IV) excludes the compound represented by Formula (IVb-1).

7. The liquid crystal composition according to claim 1, further comprising a compound represented by General Formula (V)

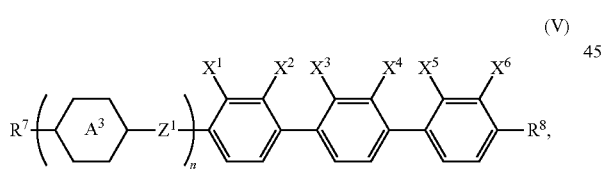

where $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; at least one hydrogen atom of the alkyl group, alkenyl group, alkoxy group, and/or alkenyloxy group is optionally substituted with a fluorine atom; the methylene group of the alkyl group, alkenyl group, alkoxy group, and/or alkenyloxy group is optionally substituted with an oxygen atom provided that the oxygen atom is not bonded to another oxygen atom in series or substituted with a carbonyl group provided that the carbonyl group is not bonded to another carbonyl group in series;

$A^3$ represents a 1,4-cyclohexylene group, a 1,4-phenylene group, or a tetrahydropyran-2,5-diyl group; in the case where $A^3$ represents a 1,4-phenylene group, at least one hydrogen atom of the 1,4-phenylene group is optionally substituted with a fluorine atom;

$Z^1$ represents a single bond, $-CH_2CH_2-$, $-OCH_2-$, $-OCF_2-$, $-CH_2O-$, or $-CF_2O-$;

n represents 0 or 1; and $X^1$ to $X^6$ each independently represents a hydrogen atom or fluorine atom, and at least one of $X^1$ to $X^6$ represents a fluorine atom.

8. The liquid crystal composition according to claim 1, further comprising a reactive monomer.

9. A liquid crystal display device comprising the liquid crystal composition according to claim 1.

10. A liquid crystal display comprising the liquid crystal display device according to claim 9.

11. The liquid crystal composition according to claim 1, further comprising a compound represented by a compound represented by formula (IIIa-1),

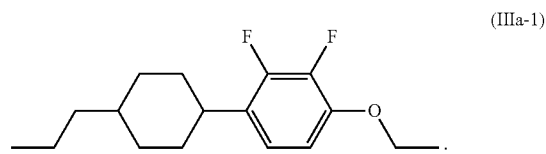 [SMILES: CCCC1CCC(c2ccc(OCC)c(F)c2F)CC1]

* * * * *